(12) United States Patent
Li

(10) Patent No.: US 11,975,262 B2
(45) Date of Patent: May 7, 2024

(54) INFORMATION PROCESSING METHOD AND APPARATUS, ELECTRONIC DEVICE, AND STORAGE MEDIUM

(71) Applicant: NETEASE (HANGZHOU) NETWORK CO.,LTD., Zhejiang (CN)

(72) Inventor: Xuemei Li, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 312 days.

(21) Appl. No.: 17/056,016

(22) PCT Filed: Jul. 24, 2019

(86) PCT No.: PCT/CN2019/097539
§ 371 (c)(1),
(2) Date: Nov. 17, 2020

(87) PCT Pub. No.: WO2020/168681
PCT Pub. Date: Aug. 27, 2020

(65) Prior Publication Data
US 2021/0370170 A1    Dec. 2, 2021

(30) Foreign Application Priority Data
Feb. 22, 2019  (CN) .......................... 201910133758.5

(51) Int. Cl.
*A63F 13/00*    (2014.01)
*A63F 13/52*    (2014.01)
(Continued)

(52) U.S. Cl.
CPC .............. *A63F 13/52* (2014.09); *G06T 19/20* (2013.01); *G06F 3/04883* (2013.01);
(Continued)

(58) Field of Classification Search
None
See application file for complete search history.

(56) References Cited

U.S. PATENT DOCUMENTS

2001/0008846 A1* 7/2001 Yamauchi ............... A63F 13/53
463/31
2001/0049300 A1* 12/2001 Okamoto ................ A63F 13/10
463/31
(Continued)

FOREIGN PATENT DOCUMENTS

CN    106492457 A    3/2017
CN    107469354 A    12/2017
(Continued)

OTHER PUBLICATIONS

Translation of CN 108376424.*
Translation of PCT Written Opinion filed Nov. 17, 2020.*
Corresponding JP search report dated Sep. 27, 2022.

*Primary Examiner* — Paul A D'Agostino
(74) *Attorney, Agent, or Firm* — Qinghong Xu

(57) ABSTRACT

An information processing method is provided. The method is applied to a touch terminal capable of presenting a graphical user interface. The graphical user interface includes a virtual character and at least part of a game scene. The method includes: determining first orientation information of at least one target virtual object that satisfies a prompt trigger event in the game scene; determining a sub-identifier corresponding to the first orientation information in a first graphical identifier, wherein the first graphical identifier is set around the virtual character; and displaying the prompt trigger event graphically on the graphical user interface through the sub-identifier. A processing apparatus, an electronic device and a storage medium are also disclosed.

20 Claims, 26 Drawing Sheets

(51) Int. Cl.
*G06T 19/20* (2011.01)
*G06F 3/04883* (2022.01)

(52) U.S. Cl.
CPC .. *G06T 2200/24* (2013.01); *G06T 2219/2016* (2013.01); *G06T 2219/2021* (2013.01)

(56) References Cited

U.S. PATENT DOCUMENTS

| | | | |
|---|---|---|---|
| 2002/0075264 A1* | 6/2002 | Iizuka | G06T 15/20 345/427 |
| 2002/0142834 A1* | 10/2002 | Sobue | A63F 13/12 463/30 |
| 2003/0112233 A1* | 6/2003 | Miida | A63F 13/52 345/419 |
| 2004/0157662 A1* | 8/2004 | Tsuchiya | A63F 13/5378 463/32 |
| 2005/0176502 A1* | 8/2005 | Nishimura | A63F 13/10 463/31 |
| 2006/0116186 A1* | 6/2006 | Sawada | C04B 37/028 463/8 |
| 2007/0146325 A1* | 6/2007 | Poston | G06F 3/038 345/163 |
| 2007/0226648 A1* | 9/2007 | Hudson | A63F 13/47 715/810 |
| 2007/0293313 A1* | 12/2007 | Shimizu | A63F 13/57 463/31 |
| 2008/0188302 A1* | 8/2008 | Haga | A63F 13/52 463/31 |
| 2010/0292008 A1* | 11/2010 | Matsumura | A63F 13/10 463/43 |
| 2012/0001944 A1* | 1/2012 | Sakurai | G06F 3/04815 345/671 |
| 2012/0021828 A1* | 1/2012 | Raitt | A63F 13/497 463/31 |
| 2013/0116019 A1* | 5/2013 | Kawano | A63F 13/10 463/2 |
| 2013/0122977 A1 | 5/2013 | Kawano et al. | |
| 2015/0258439 A1 | 9/2015 | Prosin et al. | |
| 2017/0220126 A1 | 8/2017 | Holz | |
| 2018/0353849 A1 | 12/2018 | Tahkokallio et al. | |

FOREIGN PATENT DOCUMENTS

| | | |
|---|---|---|
| CN | 107519644 A | 12/2017 |
| CN | 107754305 A | 3/2018 |
| CN | 107890672 A | 4/2018 |
| CN | 107899241 A | 4/2018 |
| CN | 107930119 A | 4/2018 |
| CN | 107977141 A | 5/2018 |
| CN | 107992252 A | 5/2018 |
| CN | 107992281 A | 5/2018 |
| CN | 108014495 A | 5/2018 |
| CN | 108376424 A | 8/2018 |
| CN | 108665553 A | 10/2018 |
| CN | 108717733 A | 10/2018 |
| CN | 109966738 A | 7/2019 |
| JP | H11-151376 A | 6/1999 |
| JP | 2009-226026 A | 10/2009 |
| JP | 2010-246851 A | 11/2010 |
| JP | 2011-212123 A | 10/2011 |

* cited by examiner

INFORMATION PROCESSING METHOD AND APPARATUS, ELECTRONIC DEVICE, AND STORAGE MEDIUM

CROSS-REFERENCE TO RELATED APPLICATIONS

The disclosure claims priority of China Patent Application No. 201910133758.5, filed on Feb. 22, 2019, entitled "Information Processing Method and Apparatus, Electronic Device, and Storage Medium", the contents of which are hereby incorporated by reference in its entirety.

TECHNICAL FIELD

The application relates to the technical field of games, and more particularly, to an information processing method and apparatus, an electronic device, and a storage medium.

BACKGROUND

In a large scene and high degree-of-freedom 3D game, part of a game scene can be observed in a game vision screen of a game character presented by a mobile terminal. When a player-controlled game character is attacked or there are other game characters or Non-Player-Controlled characters (NPC) around the game character, such as enemy characters, own characters, and monsters, it is necessary to give prompts corresponding to the player in order to make the player to respond according to the surrounding situation. In the existing games, a manner in which prompt icons representative of different target objects are displayed at different display positions by 2D in a graphical user interface is used to remind a player that there are other game characters or NPCs therearound.

SUMMARY

An object of the application is to provide an information processing method and apparatus, a mobile terminal, and a storage medium, which overcome, at least to some extent, one or more problems due to limitations and disadvantages of the related art.

In order to solve the above problem, an embodiment of the application provides an information processing method. The method may be applied to a touch terminal capable of presenting a graphical user interface. The graphical user interface may include a virtual character and at least part of a game scene. The method may include that: first orientation information of at least one target virtual object that satisfies a prompt trigger event in the game scene is determined; a sub-identifier corresponding to the first orientation information in a first graphical identifier is determined, the first graphical identifier being set around the virtual character; and the prompt trigger event is displayed graphically on the graphical user interface through the sub-identifier.

An embodiment of the application also provides an information processing apparatus. The information processing apparatus may include: a detection component, configured to determine first orientation information of at least one target virtual object that satisfies a prompt trigger event in the game scene; a determination component, configured to determine a sub-identifier corresponding to the first orientation information in a first graphical identifier, the first graphical identifier being set around the virtual character; and a display component, configured to display the prompt trigger event graphically on the graphical user interface through the sub-identifier.

An embodiment of the application also provides an electronic device. The electronic device may include: a processor; and a memory, configured to store an executable instruction of the processor, the processor being configured to perform the above information processing method by executing the executable instruction.

An embodiment of the application also provides a computer-readable storage medium. The computer-readable storage medium may store a program. The program may be executed by a processor to implement the above information processing method.

BRIEF DESCRIPTION OF THE DRAWINGS

The above and other features and advantages of the present disclosure will become more apparent from the detailed description of exemplary embodiments with reference to the drawings. It is apparent that the drawings in the following description are only some embodiments of the present disclosure, and other drawings can be obtained from those skilled in the art according to these drawings without any creative work. In the drawings.

DETAILED DESCRIPTION OF THE EMBODIMENTS

Figure 1:
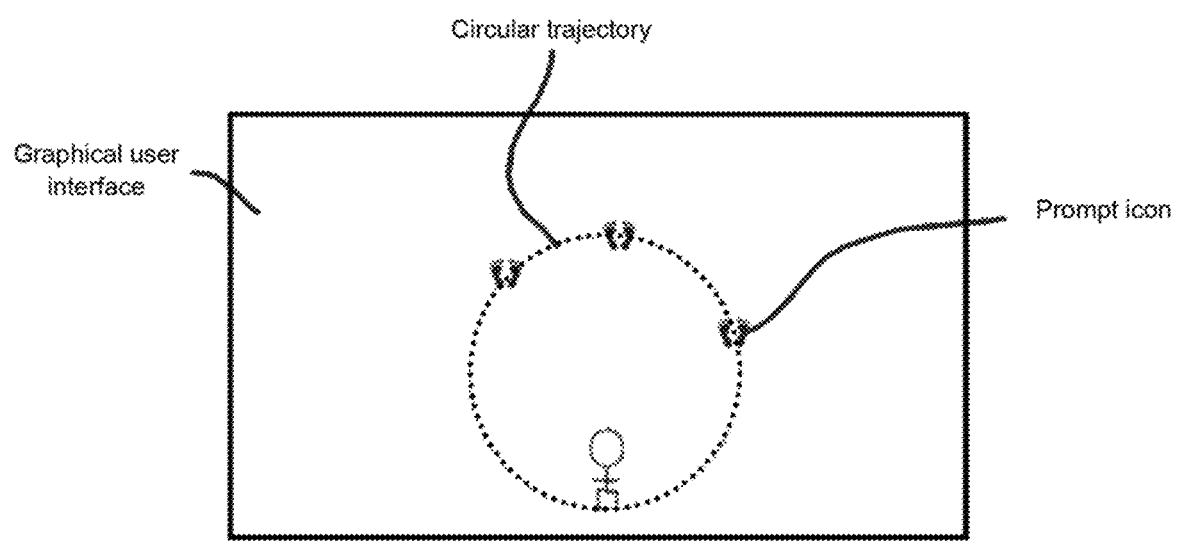
FIG. 1 is a prompt icon scheme in the conventional art.

It is to be noted that in the case of no conflict, the features in the embodiments and the embodiments in the present application may be combined with each other. The application is described below with reference to the drawings and in conjunction with the embodiments in detail.

In order to make those skilled in the art better understand the solutions of the present application, the technical solutions in the embodiments of the present application will be clearly and completely described below with reference to the drawings in the embodiments of the present application. It is apparent that the described embodiments are only a part of the embodiments of the present application, not all of the embodiments. All other embodiments obtained by those of ordinary skill in the art based on the embodiments of the present application without creative efforts should fall within the scope of protection of the present application.

It is to be noted that the specification and claims of the present application and the terms "first", "second" and the like in the drawings are used to distinguish similar objects, and do not need to describe a specific sequence or a precedence order. It will be appreciated that data used in such a way may be exchanged under appropriate conditions, in order that the embodiments of the present application described here can be implemented. In addition, terms "include" and "have" and any variations thereof are intended to cover non-exclusive inclusions. For example, it is not limited for processes, methods, systems, products or devices containing a series of steps or components to clearly list those steps or components, and other steps or components which are not clearly listed or are inherent to these processes, methods, products or devices may be included instead.

It is also to be noted that various triggering events disclosed in the present specification may be preset, and may also be set in real time according to operating instructions of users in a program running process. Different triggering events may trigger to execute different functions.

Figure 2:
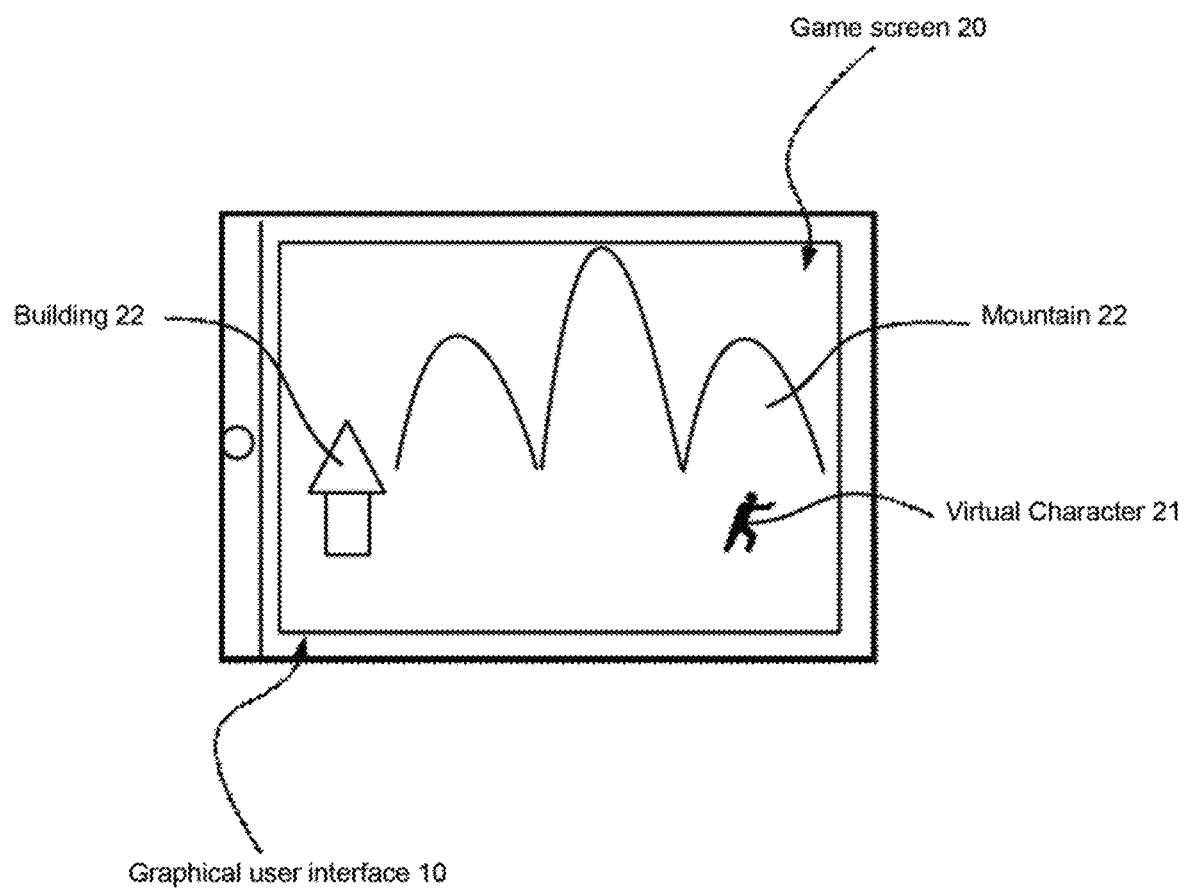
FIG. 2 is a schematic diagram of a graphical user interface according to an embodiment of the application.
Figure 3:
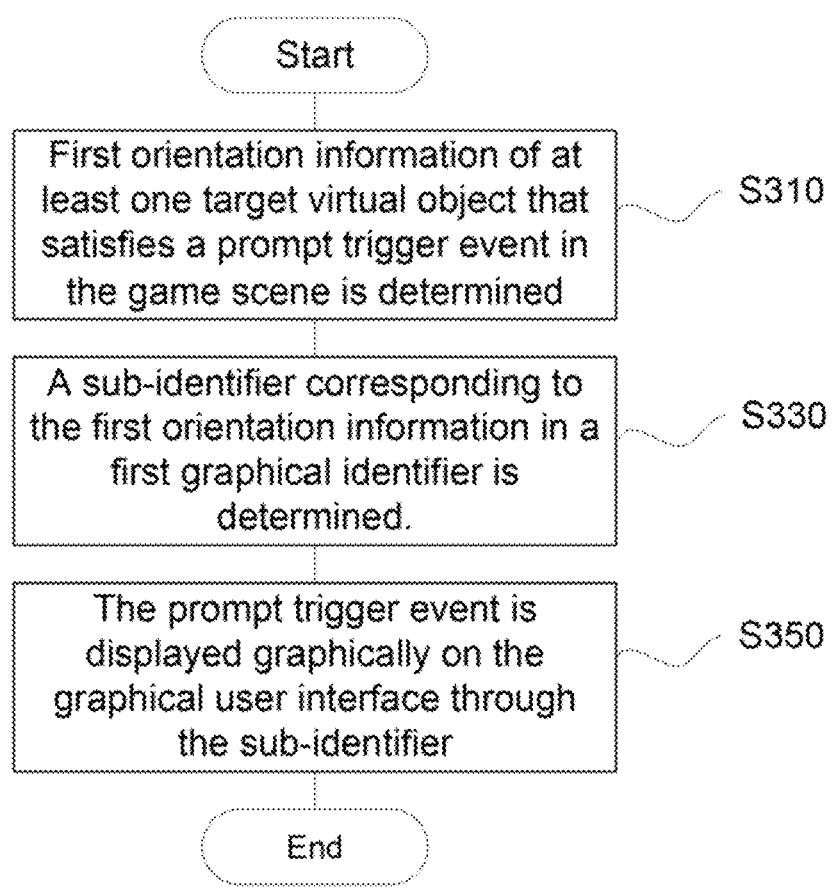
FIG. 3 is a flowchart of an information processing method according to an embodiment of the application.

FIG. 3 is an information processing method described and disclosed according to an embodiment. In an optional implementation manner, an information processing method is illustrated by different examples. The information processing method provided in an optional implementation manner is performed on an electronic device. The electronic device may be any terminal device such as a computer, a tablet, or a mobile terminal. As shown in FIG. 2, a software application is executed on a processor of the electronic device, and a graphical user interface 10 is obtained by rendering on a touch display of the electronic device. The content displayed by the graphical user interface 10 at least partially includes a local or global game screen 20, and the game screen 20 includes a game scene and at least one virtual object 21. The size of the graphical user interface 10 may be the same as the size of the game screen 20, that is, the game screen 20 is displayed in full screen.

The game screen 20 may include a virtual resource 22 relatively fixed in position, such as ground, mountains, stones, flowers, grass, trees, buildings or other virtual resources 22. The virtual object 21 may be a virtual object 21 of an enemy camp, or may be a virtual object 21 of an own camp. The virtual object 21 may perform corresponding actions in the game scene in response to an operation of a user. For example, the user may control the virtual object 21 to walk, run, squat, bend, attack, shoot, etc. in the game scene. The application is not limited herein.

The current screen content of the game screen 20 corresponds to the current presentation visual field of the virtual object 21. The presentation visual field is related to the orientation of the virtual object 21, a game program renders the corresponding game scene in the current orientation of the virtual object 21 to form a game screen 20 displayed in the graphical user interface 10 of the electronic device, and the current game screen 20 is used as the current presentation visual field of the virtual object 21, such as the game screen 20 displayed in FIG. 2. It is to be noted that the orientation of the virtual object 21 is usually tied to a virtual camera. In a first-person game, the virtual camera may be an "eye" of a user in the game, and the virtual camera may be arranged on the head of the virtual object 21. In a third-person game, the virtual camera may be arranged behind and above the virtual object 21, and a game scene including the virtual object 21 may be captured. The current position of the virtual object 21 in the game scene is determined according to the movement of the virtual object 21 in the game scene, so as to determine the position of the virtual camera in the game scene according to the current position of the virtual object 21 in the game scene. In addition, the orientation of the virtual camera in the game scene is determined according to the current orientation of the virtual object 21 in the game scene. Therefore, the current position and orientation of the virtual camera are determined according to the position and orientation of the virtual object 21 in the game scene. Further, the presentation visual field of the game screen on the graphical user interface 10 is determined according to the current position and orientation of the virtual camera. When a viewing angle adjustment touch instruction is received, the game program renders a corresponding presentation visual view of the changed game screen according to the viewing angle adjustment touch instruction. It is to be noted that when a viewing angle is adjusted by the viewing angle adjustment touch instruction, the orientation of the virtual object 21 is not changed. In other implementation manners, the orientation of the virtual object 21 may be changed at the same time.

The information processing method provided in an optional implementation manner is applied to a touch terminal capable of presenting a graphical user interface. Meanwhile, referring to FIG. 4, the graphical user interface includes a virtual character and at least part of a game scene. The method includes the following steps.

In step S310, first orientation information of at least one target virtual object that satisfies a prompt trigger event in the game scene is determined.

In step S330, a sub-identifier corresponding to the first orientation information in a first graphical identifier is determined. The first graphical identifier is set around the virtual character.

In step S350, the prompt trigger event is displayed graphically on the graphical user interface through the sub-identifier.

According to the above implementation manner, a first graphical identifier is set around a virtual character, so that the first graphical identifier is displayed on a graphical user interface with a visual stereoscopic effect. Meanwhile, the first graphical identifier includes multiple sub-identifiers, each of which corresponds to different directions. When a target virtual object that satisfies a prompt trigger event is detected, first orientation information of the target virtual object is acquired, and a sub-identifier corresponding to the first orientation information in the first graphical identifier is determined, and the sub-identifier is further displayed on the graphical user interface to display a corresponding prompt trigger event. In this way, a sub-identifier set around a virtual character may clearly and comprehensively correspond to a spatial position of a target virtual object in a game scene, so that a user can intuitively understand the position of the target virtual object in a game.

However, the existing method is to display a prompt icon on a 2D graphical user interface. Neither the prompt icon itself nor the game screen has a perspective effect. As shown in FIG. 1, the prompt icon is displayed in a circular trajectory, and a game vision screen is a 3D screen, which makes the prompt icons fail to accurately and fully reflect the position of other game characters or NPCs in a 3D game scene, so that players cannot quickly make a response after seeing the prompt icons in the graphical user interface.

Compared to the manner in which the existing 2D prompt icon displayed with a direct-view effect on the graphical user interface can only indicate the two-dimensional orientation of a target object in a 3D game scene, the above implementation manner provided in the application can accurately and comprehensively indicate a spatial position of a target virtual object in the 3D game scene by a first graphical identifier, so that a player can more intuitively establish a correspondence of the first graphical identifier and scene information in the 3D game scene, thereby improving the experience of the player.

Figure 13:
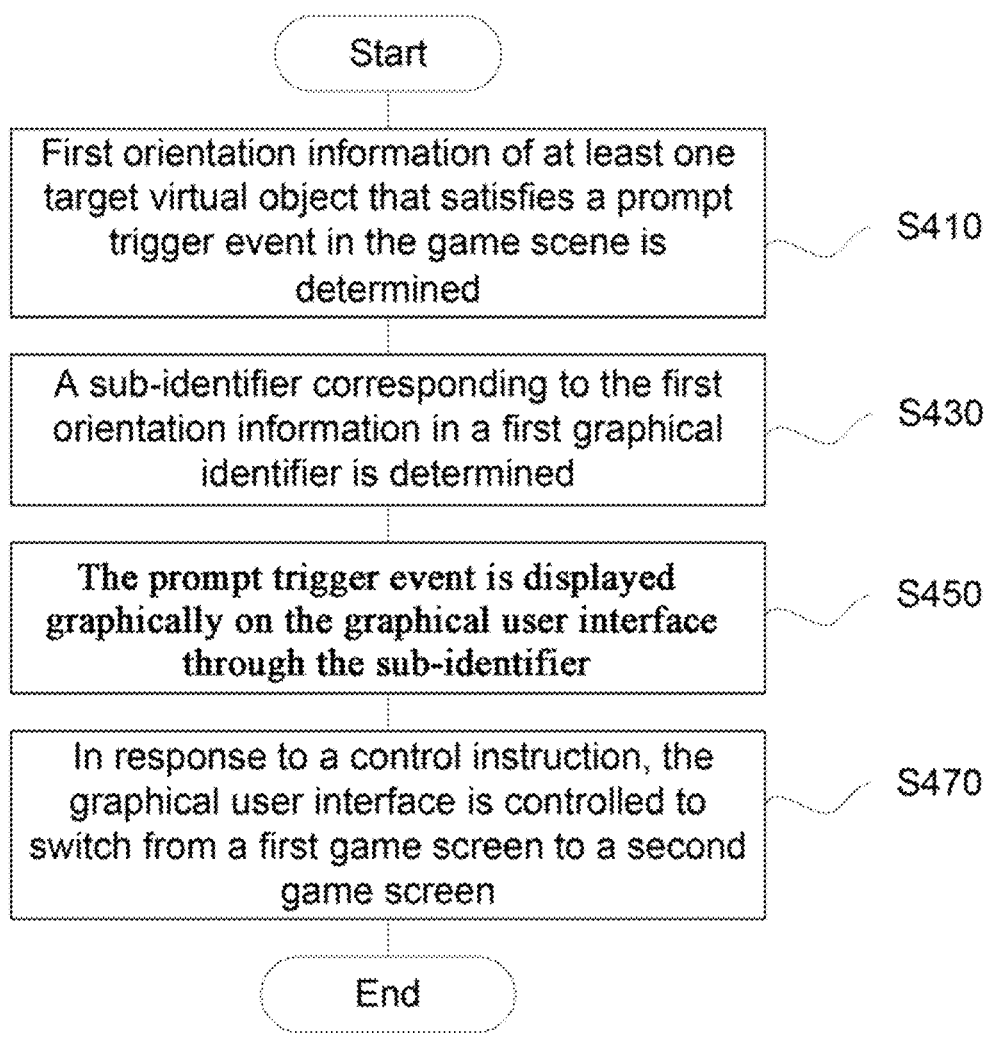
FIG. 13 is a flowchart of an information processing method according to an embodiment of the application.

As shown in FIG. 13, in an optional implementation manner, the information processing method is applied to a touch terminal capable of presenting a graphical user interface. The graphical user interface includes a virtual character and at least part of a game scene. The virtual character is a virtual object corresponding to a game program run by an electronic device currently. By adjusting a viewing angle or orientation of the virtual object, the presentation visual field of the virtual object corresponding to the current screen content of a game screen can be changed. The method includes the following steps.

In step S410, first orientation information of at least one target virtual object that satisfies a prompt trigger event in the game scene is determined. The target virtual object is a virtual resource 20 or a virtual object 10 that satisfies a prompt trigger event in the game scene.

The satisfying prompt trigger event is a game event related to a virtual character determined according to game logic. In an optional implementation manner, at least one target virtual object that satisfies a prompt event is a sound source within a preset range determined according to the virtual character. The sound source may be a virtual resource that makes a sound, such as a door that makes a closing sound, or a glass window that makes a breaking sound. The sound source may also be a virtual object that makes a sound, such as an enemy virtual object that makes a walking sound, and a virtual object that makes a gun sound. In an optional implementation manner, a preset range determined according to the virtual character is a preset range determined according to character attributes of the virtual character. The character attributes may include one or more of the following: position information, skill information, sight distance information and the like of the virtual character. For example, the preset range determined according to the position information of the virtual character is an annular region centered on the current position of the virtual character and with a preset distance from the virtual character being a radius. The preset range determined according to the sight distance information of the virtual character is an annular region centered on the current position of the virtual character and with a sight distance of the virtual character being a radius. When determining the range, the preset region corresponding to the skill information of the virtual character may be used as the preset range, or other corresponding values for determining the character attributes of the preset range may be determined according to the skill information, thus determining the preset range according to the corresponding values for determining the character attributes of the preset range.

In an optional implementation manner, at least one target virtual object that satisfies a prompt event is a virtual object that performs a preset operation on the virtual character. The preset operation is a behavior that the virtual object determined according to game logic may collide with the virtual character, such as hitting a virtual character with a bare hand at a close range, or hitting a virtual character with a firearm.

Figure 5:
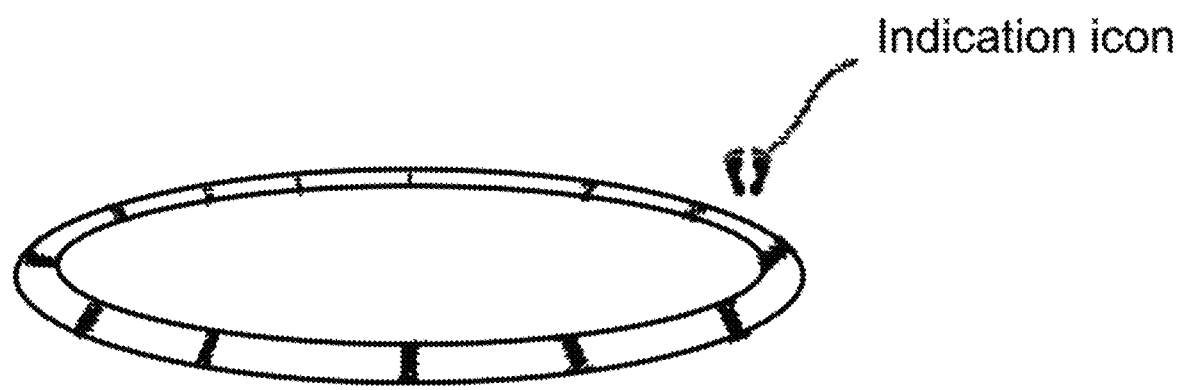
FIG. 5 is a schematic diagram of an indication icon according to an embodiment of the application.

Different target virtual objects that satisfy the prompt event in the above implementation manner may exist simultaneously, and of course, only a part of the target virtual objects may be determined according to a preset selection condition. Meanwhile, when the same target virtual object is both a sound source and a virtual object for performing a preset operation on the virtual character, the type of the virtual object is determined according to a preset priority rule. The type of the virtual object is used for displaying an indication icon corresponding to the type on the graphical user interface, as shown in FIG. 5. For example, when a virtual object within a preset range determined according to the virtual character hits the virtual character with a firearm, it is determined that the virtual object is a target virtual object that performs a preset operation on the virtual character, rather than a sound source virtual object.

In an optional implementation manner, the first orientation information is three-dimensional information of the virtual object. In an optional implementation manner, the three-dimensional information includes height information and position information on a horizontal plane. It is to be noted that the horizontal plane may be determined according to a coordinate system establishment rule in the game, or may be performed according to the needs of users. For example, in a three-dimensional coordinate system defined by X, Y, and Z axes, a plane determined by the X and Y axes may be the horizontal plane, and then information of the Z axis is the height information. Similarly, a plane determined by the X and Z axes is the horizontal plane, and then information of the Y axis is the height information. In an optional implementation manner, the three-dimensional information may also include other information corresponding to the type of the orientation information in the game scene.

In an optional implementation manner, the first orientation information is three-dimensional information of the virtual object in the game scene. A game world coordinate system is established. The world coordinate system is a three-dimensional coordinate system. The positions of the virtual resource and the virtual object in the game scene are determined by coordinate values in the world coordinate system.

In an optional implementation manner, the first orientation information is a relative position relationship between the target virtual object and the virtual character. It is to be noted that the relative position relationship is still a three-dimensional relationship. The relative position relationship is determined by means of the position information of the target virtual object and the virtual character, for example, a three-dimensional vector. For example, the position information of the target virtual object is (X1, Y1, Z1), and the position information of the virtual character is (X2, Y2, Z2). Then, the relative position relationship is ((X1-X2) (Y1-Y2) (Z1-Z2)). It is to be noted that the three-dimensional relationship may also be determined in other modes, as long as the accurate position of the target virtual object can be determined.

By means of the above implementation manner, first orientation information of a target virtual object is determined. The first orientation information is composed of three-dimensional information that determines a unique position of the target virtual object. The first orientation information is combined with a first graphical identifier to indicate an accurate position of the target virtual object, which is convenient for a player to quickly and accurately know a specific orientation of the target virtual object through a current game screen. However, the existing way of a prompt icon in the game cannot clearly indicate stereoscopic orientation information of the target virtual object in the game.

In an optional implementation manner, the first orientation information is two-dimensional information of the virtual object. For example, the two-dimensional information is orientation information of the target virtual object in a horizontal plane. In an optional implementation manner, the first orientation information is two-dimensional information of the virtual object in the game scene. In an optional implementation manner, the first orientation information is a relative position relationship between the target virtual object and the virtual character. The relative position relationship is a two-dimensional relationship. By means of the present implementation manner, acquired two-dimensional information of a virtual object is used in combination with a first graphical identifier set around a virtual character. Since the first graphical identifier has a perspective effect, the first graphical identifier may more intuitively display the position of a target virtual object in a game than the existing prompt icon, so that it is possible to achieve a more comprehensive indication effect with less data information, improving the player experience, and not bringing rich computing requirements to a system.

In step S430, a sub-identifier corresponding to the first orientation information in a first graphical identifier is determined. The first graphical identifier is set around the virtual character.

Figure 6:
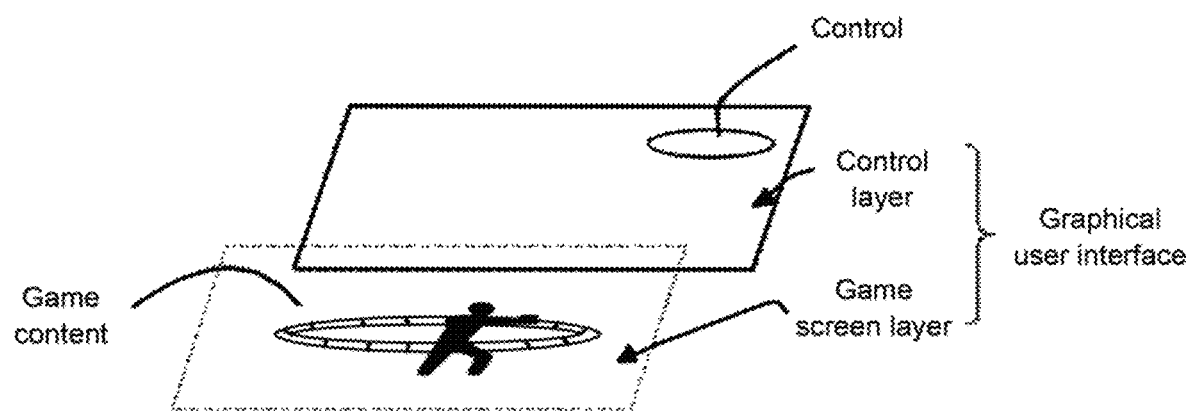
FIG. 6 is a schematic layer diagram of a graphical user interface according to an embodiment of the application.

As shown in FIG. 6, the electronic device includes a display screen. The display screen displays the running content through a display interface of the graphical user interface. When the electronic device runs a game, the graphical user interface includes a control layer for displaying an interaction control and a game screen layer displaying a game screen with the game content. The first graphical identifier is a graphical identifier displayed on the graphical user interface. In an optional implementation manner, the first graphical identifier is a game model arranged in the game scene. The game model is combined with the virtual character by means of a model hook. The player sees the first graphical identifier through the game screen displayed on the current display interface.

By means of the above implementation manner, the first graphical identifier surrounding the game character is set in the game scene, so that the first graphical identifier is more realistically combined with the game scene, and the position of the target virtual object in the game can be more intuitively and accurately indicated.

In an optional implementation manner, the first graphical identifier is a control identifier in the graphical user interface. For example, the first graphical identifier is provided in a control layer of the graphical user interface. The display position of the identifier may be fixed at a specific display position, and the display position of the control identifier may also be determined according to the display position of the virtual character on the game screen. A specific determination mode may be determined according to the display logic of the game. For example, when the display position of the virtual character in the game screen is variable, the display position of the control identifier is determined according to the display position of the virtual character on the game screen. When the display position of the virtual character in the game screen is not variable, a specific display position of the graphical user interface is set in advance.

By means of the above implementation manner, by controlling the display control on the graphical user interface, not only the position of the target virtual object in the game is intuitively and accurately indicated, but also the rendering data of the game screen is reduced, thereby reducing the rendering pressure and improving the graphics processing speed.

Figure 7A:
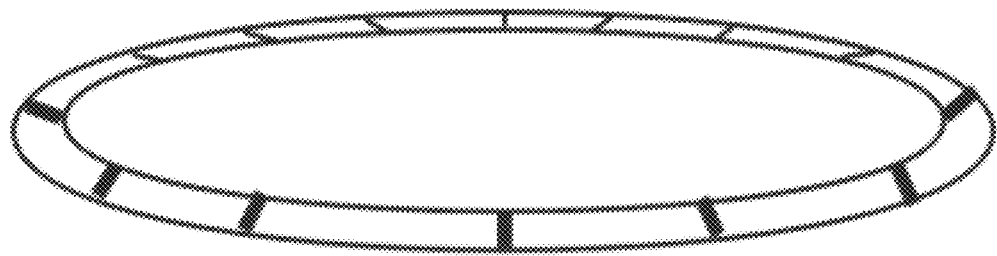
FIG. 7A and FIG. 7B in FIG. 7 are schematic diagrams of an annular first graphical identifier according to an embodiment of the application.
Figure 7B:
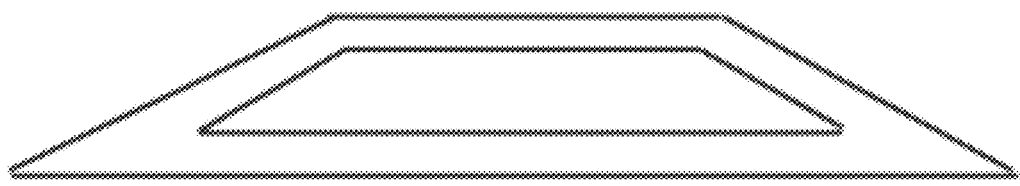
Figure 8:
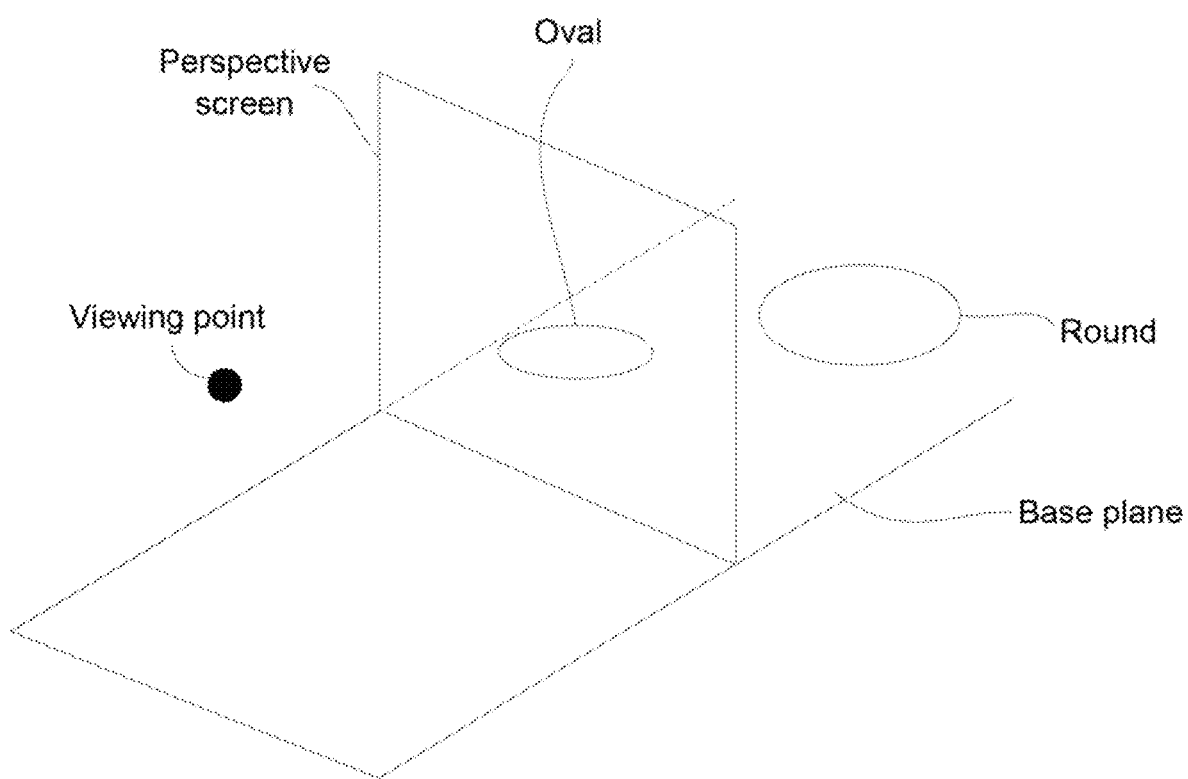
FIG. 8 is a schematic process diagram of a first graphical identifier presented on a graphical user interface according to an embodiment of the application.

The first graphical identifier is set around the game character. In an optional implementation manner, as shown in FIGS. 7A-7B, the first graphical identifier is an annular game model in the game scene, and the virtual character passes through the annular game model. For example, the first graphical identifier is a circular game model, sleeved on the periphery of the virtual character. By displaying the position of the virtual camera of the game screen, the first graphical identifier displayed in the last graphical user interface has a perspective effect. It is easier for the player to establish a correspondence relationship between the first graphical identifier and the position of the target virtual object in the game. In an optional implementation manner, the first graphical identifier is a control identifier on the graphical user interface, the first graphical identifier is a perspective plane geometric shape identifier, and the display position of the first graphical identifier on the graphical user interface intersects with the display position of the virtual character in the game screen. For example, as shown in FIG. 8, the shape of the first graphical identifier in the graphical user interface is a shape with a perspective effect formed when a circle is drawn according to perspective science, and the shape has a perspective effect in combination with the game screen. For example, the graphical user interface is taken as a perspective screen and a plane at a certain angle to the perspective screen is taken as a base plane, for example, parallel to the ground. At this time, the shape of the first graphical identifier in the graphical user interface is a shape of a circle on the base plane observed through the perspective screen. It is to be noted that the present implementation manner emphasizes the state of the first graphical identifier on the graphical user interface, rather than the state of the first graphical identifier when the game is produced.

For example, the first graphical identifier is circular when it is produced, and when it is running in the game, the display is performed with a perspective effect, so that the first graphical identifier is displayed in an oval shape on the graphical user interface.

Through the above implementation manner, the first graphical identifier has a stereoscopic perspective effect, and the first graphical identifier with the stereoscopic perspective effect may effectively represent orientation information in a 3D game scene. According to the first orientation information of the target virtual object, a corresponding sub-identifier with the stereoscopic perspective effect in the first graphical identifier with the stereoscopic perspective effect is determined, and the stereoscopic perspective effect of the sub-identifier can clearly reflect the first orientation information of the target virtual object. In this way, the user can intuitively understand the position of the target virtual object in the game.

In an optional implementation manner, the first graphical identifier includes at least two sub-identifiers, and at least two sub-identifiers collectively constitute the first graphical identifier. The sub-identifier is used to prompt the orientation information of the target virtual object. In an optional implementation manner, the number of sub-identifiers of the first graphical identifier is a preset value. For example, the number of sub-identifiers of the first graphical identifier is 8. In an optional implementation manner, the number of the sub-identifiers of the first graphical identifier is a preset value, which may be determined according to a correspondence relationship between the orientation range of the virtual character and the preset number. For example, in a racing game, the orientation range of the virtual character is 145 degrees, so the corresponding preset value is 4. In an optional implementation manner, by providing a setting interface, the player can set the corresponding number of sub-identifiers of the first graphical identifier.

Figure 4:
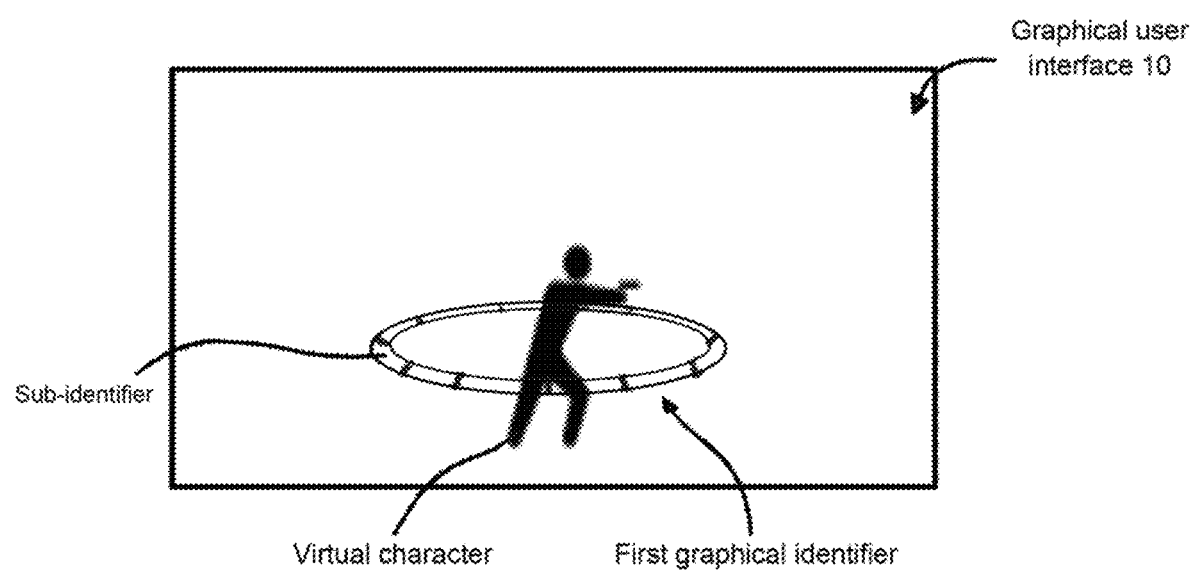
FIG. 4 is a schematic diagram of a first graphical identifier provided around a virtual character according to an embodiment of the application.

In an optional implementation manner, the sub-identifiers of the first graphical identifier have different display sizes. As shown in FIG. 4 and FIG. 5, the display size of the sub-identifier is determined according to a position relationship between the sub-identifier and the virtual character. For example, a first display size of the sub-identifier of the virtual character facing forward is smaller than a second display size of the sub-identifier of the virtual character facing rearward. Further, the sub-identifier is provided with a preset function. In an optional implementation manner, the preset function is to control the virtual character to rotate to an orientation corresponding to the sub-identifier. When it is determined that the sub-identifier is triggered, the virtual character is controlled to perform the preset function corresponding to the sub-identifier, that is, the orientation of the virtual character is controlled to be adjusted to an angle corresponding to the sub-identifier.

In a 3D scene game, the screen displayed by the electronic device is usually a screen related to the orientation or perspective of the game character. That is, when it is detected that a target virtual object exists in front of the orientation of the game character, it is easier for the player to find the target virtual object on the screen, and therefore it is necessary to control the probability of changing the direction or perspective of the virtual character by clicking the sub-identifier. However, when it is detected that a target virtual object exists behind the orientation or perspective of the game character, the manner of adjusting a movement control or an orientation control to adjust the game screen to the direction of the target virtual object is not very convenient, and it is easy to delay the best game response timing, so in this case, the player needs to trigger the corresponding sub-identifier quickly and accurately. By means of the above implementation manner, the display size of the sub-identifier is determined according to the position relationship between the sub-identifier and the virtual character, so that the display size of the sub-identifier on the graphical user interface is more convenient for the user to touch, and the user experience is improved.

Figure 9A:
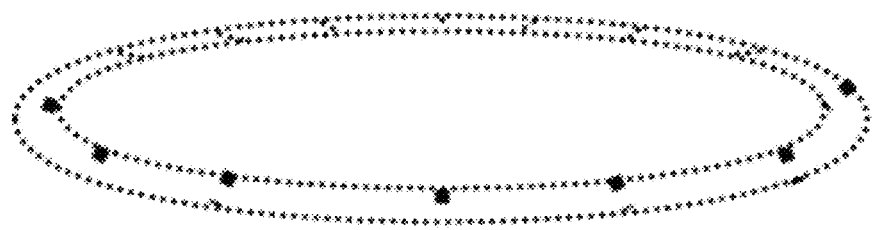
FIG. 9A to FIG. 9C in FIG. 9 are schematic diagrams of a first graphical identifier with different display parameters according to an embodiment of the application.
Figure 9B:
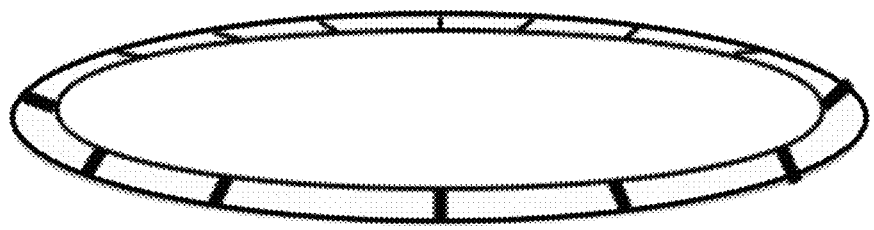
Figure 9C:
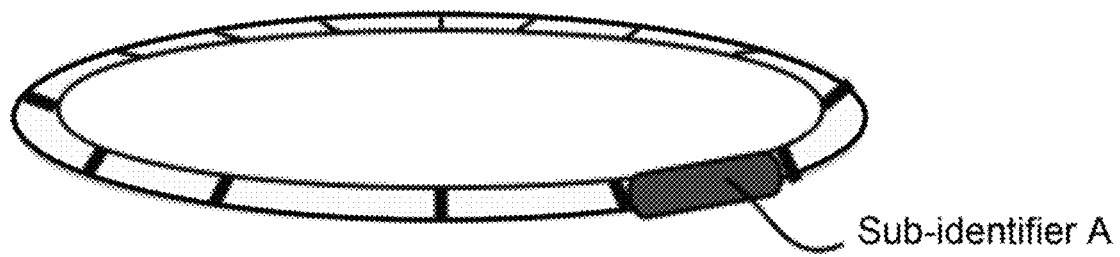

In an optional implementation manner, a sub-identifier is created in advance, and a display parameter of the sub-identifier is determined by setting an initial first display parameter of the first graphical identifier. For example, the first display parameter may be a transparent value with a value of 0, and is not displayed in the graphical user interface, as shown in FIG. 9A. The first display parameter may be a transparent value with a value of 30. At this time, the outline of the first graphical identifier may be displayed in the graphical user interface, as shown in FIG. 9B. In the present implementation manner, the operation that the prompt trigger event is displayed graphically on the graphical user interface through the sub-identifier is that: the sub-identifier is controlled to be displayed with a second display parameter different from the first display parameter. The second display parameter is different from the first display parameter by setting different parameter values. As shown in a sub-identifier A in FIG. 9C, the sub-identifier A is displayed with a second display parameter different from other sub-identifiers. The player can know a specific determined sub-identifier, for example, by adjusting a transparency value, a color value, or a size.

By means of the above implementation manner, since the sub-identifier is created in advance, after the sub-identifier corresponding to the first orientation information is determined, the purpose of indicating the orientation of the target virtual object through the sub-identifier can be achieved by adjusting the display parameter. In this way, the calculation speed can be improved.

In an optional implementation manner, the sub-identifiers constituting the first graphical identifier are not created in advance. The first orientation information of the target virtual object is acquired, and a display position determination rule for the sub-identifier is set in advance. According to the first orientation information and the display position determination rule, the display position of the sub-identifier is determined, and the generation of the sub-identifier at the display position is controlled. By means of the above implementation manner, the number of models to be rendered on the screen can be reduced, and the pressure on image data processing can be reduced.

Figure 10:
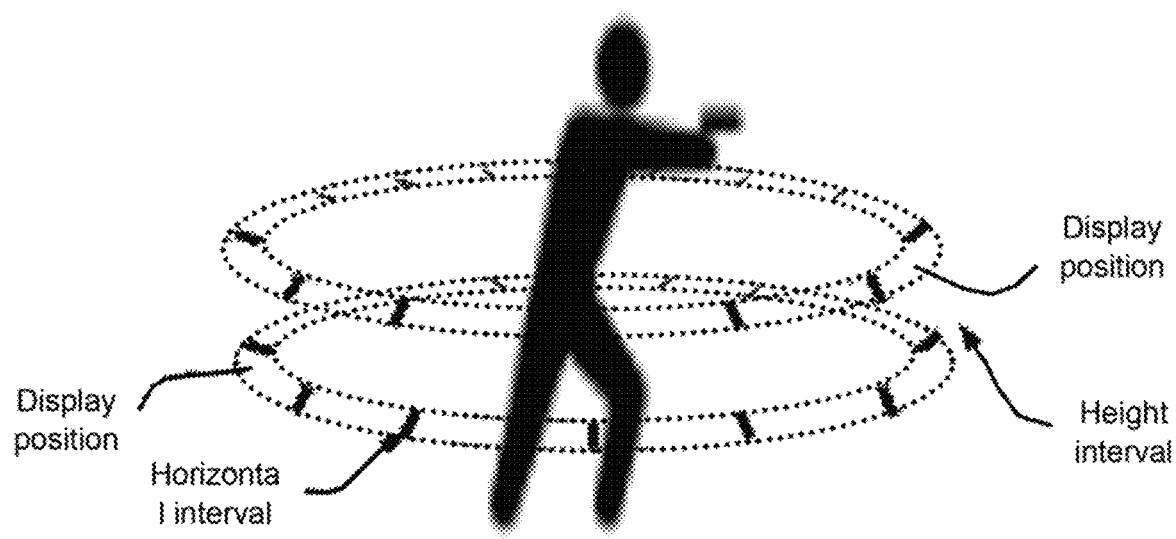
FIG. 10 is a schematic diagram of a display position according to an embodiment of the application.

As shown in FIG. 10, in an optional implementation manner, the first graphical identifier provides at least two display positions for the sub-identifiers, and a first graphical identifier having a corresponding indication effect is formed by displaying the sub-identifiers at different display positions. It is to be noted that the provision of at least two display positions for the sub-identifiers mentioned herein may refer to controlling the same sub-identifier to be displayed from the current display position to another display position, or may refer to displaying different sub-identifiers at different display positions. The specific manner may be determined according to the actual situation.

In the present implementation manner, at least two display positions are set around the virtual character at a preset height interval. For example, the first graphical identifier includes 24 sub-identifiers, each 8 sub-identifiers form a group, and there are three groups. The 8 sub-identifiers of each group are arranged in a ring around the virtual character through display positions to form a layer of graphical identifiers. Three layers of graphical identifiers are formed with a preset height setting of each group of layer identifiers. The height information of the target virtual object indicated by the sub-identifiers located on the upper layer is higher than the height information of the target virtual object indicated by the sub-identifiers located on the lower layer.

By means of the above implementation manner, a first graphical identifier having a perspective effect can be established, and the target virtual objects with different height information are characterized by using sub-identifiers arranged according to a preset height, so that the first graphical identifier can more comprehensively indicate the exact position of the target virtual object in the game. Compared with the existing provision of flat prompt icons having no perspective effects on the graphical user interface, the combination of the first graphical identifier with the first orientation information of the target virtual object in the game provided in the application may indicate target virtual objects at different heights in the game scene.

Figure 11A:
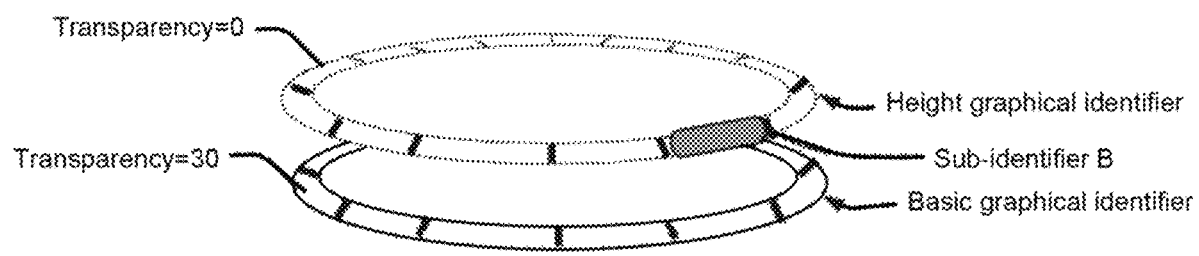
FIG. 11A and FIG. 11B in FIG. 11 are schematic diagrams of a basic graphical identifier and a height graphical identifier according to an embodiment of the application.
Figure 11B:
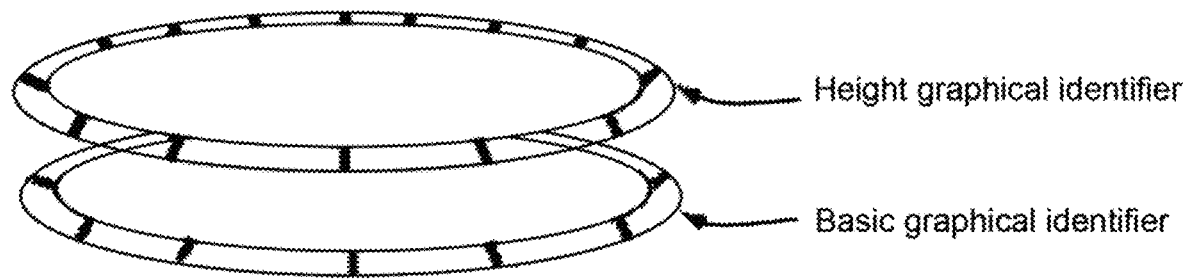

In the present implementation manner, the first graphical identifier includes a basic graphical identifier and a height graphical identifier. Both of the basic graphical identifier and the height graphical identifier are composed of the aforementioned at least two sub-identifiers. In an optional implementation manner, the basic graphical identifier is at least an identifier corresponding to the height of a horizontal plane in the game scene, the height graphical identifier is an identifier at a preset height interval with the basic graphical identifier, and the height graphical identifier is at least an identifier corresponding to non-horizontal heights in the game scene. For example, in addition to corresponding to the height of the horizontal plane, the basic graphical identifier also corresponds to the direction information on the horizontal plane (such as the east direction). The non-horizontal height in the game scene corresponding to the height graphical identifier may be a valley below the horizontal plane, or a house. At the same time, the height graphical identifier corresponds to the direction information (such as the east direction) on the corresponding horizontal plane, such as a roof in the east direction. In an optional implementation manner, the basic graphical identifier is at least an identifier corresponding to the height in the current position of the virtual character, the height graphical identifier is an identifier at a preset height interval with the basic graphical identifier, and the height graphical identifier is at least an identifier corresponding to the height of a non-virtual character. The example is different from the foregoing example only in the selection of the orientation information, so it will not be described again. The basic graphical identifier is displayed on the graphical user interface with a first display parameter, and the height graphical identifier is displayed with a second display parameter. In an optional implementation manner, as shown in FIG. 11A, the second display parameter includes a transparency parameter. The transparency value is 0, that is, the graphical user interface can only display the basic graphical identifier displayed with the first display parameter, and the transparency of the height graphical identifier is 0. In an optional implementation manner, as shown in FIG. 11B, the second display parameter is the same as the first display parameter, that is, in an initial state, the basic graphical identifier and the height graphical identifier are controlled to be displayed on the graphical user interface with the first display parameter. Further, the operation that the prompt trigger event is displayed graphically on the graphical user interface through the sub-identifier may be implemented by the following manners that: the sub-identifier is controlled to be displayed with a third display parameter different from the first display parameter and a second display parameter. For example, the sub-identifier B in FIG. 11A is displayed with a third display parameter different from the first display parameter and a second display parameter.

By means of the above implementation manner, the basic graphical identifier is used as a reference to be always displayed in the graphical user interface. When the sub-identifier in the height graphical identifier corresponding to the target virtual object is displayed with the third display parameter, a relative position relationship between the height graphical identifier and the basic graphical identifier can clearly and comprehensively show the position of the target virtual object in the game.

In an optional implementation manner, the target virtual object includes type information. For example, the type information includes: enemy characters and teammate characters. Further, the operation that the sub-identifier is controlled to be displayed with a third display parameter different from the first display parameter and the second display parameter further includes that: the sub-identifier is controlled to be displayed with the corresponding color parameter according to the types of the target virtual object. The third display parameter includes a color parameter, and a correspondence relationship between a target virtual object type and a color parameter is established in advance. In specific implementation, after the target virtual object is determined, first type information of the target virtual object is acquired, a color parameter in the third display parameter is determined according to the correspondence relationship between the target virtual object type and the color parameter and the first type information, and the sub-identifier is controlled to be displayed with the corresponding color parameter. For example, the color parameter corresponding to the enemy character is red, and the color parameter corresponding to the teammate character is not red.

In another optional implementation manner, at least two display positions are set around the virtual character at a preset horizontal interval. For example, the first graphical identifier includes 8 sub-identifiers, and the 8 sub-identifier annularly surround the virtual character at preset horizontal intervals. As mentioned above, the first graphical identifier set around the virtual character can clearly indicate the position of the target virtual object in the game. For example, whether it is in front of or behind the game character, compared with the existing provision of flat prompt icons having no perspective effects on the graphical user interface, after seeing the prompt icon on the graphical user interface, the player has a certain cost of cognitive conversion from plane to space. After obtaining the prompt icon, the player often loses the target and cannot find the orientation of the target virtual object. The combination of the first graphical identifier with a sense of space provided in the application with the first orientation information of the target virtual object in the game can directly indicate the position of the target virtual object in the game, thereby reducing the cognitive conversion cost, and improving the user experience.

It is to be noted that the above-mentioned implementation manners of at least two display positions are not mutually exclusive, but can be combined as required. For example, multiple sub-identifiers of the first graphical identifier may be set at a preset height interval in the height direction, and the sub-identifiers in the horizontal direction are set at a preset horizontal interval.

In an optional implementation manner, a correspondence relationship between the sub-identifier and relative orientation information of the virtual character is established in advance, and the first orientation information is a relative position relationship between the target virtual object and the virtual character. In the present implementation manner, the first orientation information may include height information and direction information on a horizontal plane. In other implementation manners, the first orientation information may include only direction information on a horizontal plane. The height information and the direction information on the horizontal plane are relative information, and the specific content has been recorded in the foregoing, and will not be repeated here. The relative position information of the virtual character refers to position information of a virtual resource or a virtual object in the game scene relative to the virtual character.

In an optional implementation manner, a correspondence relationship between the sub-identifier and orientation information in the game scene is established in advance, and the first orientation information is orientation information of the target virtual object in the game scene. In the present implementation manner, the first orientation information may include height information and direction information on a horizontal plane. In other implementation manners, the first orientation information may include only direction information on a horizontal plane. The height information and the direction information on the horizontal plane are orientation information in the game scene, and the specific content has been recorded in the foregoing, and will not be repeated here.

In the present implementation manner, the operation that the sub-identifier corresponding to the first orientation information in the first graphical identifier may be performed by the following steps: after acquiring the first orientation information of the target virtual object, the corresponding sub-identifier in the first graphical identifier is determined according to the first orientation information and the correspondence relationship. In an optional implementation manner, the first orientation information may be generated by offline data, and a list of relative position relationships between the target virtual object and the virtual character is generated offline. During the game running process, after acquiring the target orientation information of the target virtual object and the character orientation information of the virtual character, the first orientation information is determined by generating a list of relative position relationships between the target virtual object and the virtual character offline. In an optional implementation manner, the first position information may be implemented by: acquiring target orientation information of the target virtual object and character orientation information of the virtual character; obtaining a direction vector according to the target orientation information of the target virtual object and the character orientation information of the virtual character; and determining the first orientation information according to direction information of the direction vector.

By means of the above implementation manner, the first graphical identifier is arranged on the graphical user interface in an arrangement with a perspective effect, the corresponding sub-identifier may be determined by means of the correspondence relationship and the first orientation information after acquiring the first orientation information of the target virtual object by establishing the correspondence relationship between the sub-identifier in the first graphical identifier and the orientation information in the game scene or relative orientation information of the game character. By displaying the sub-identifier with a perspective effect, the position of the target virtual object in the game can be intuitively and clearly indicated.

In step S450, the prompt trigger event is displayed graphically on the graphical user interface through the sub-identifier. Specifically, the first graphical identifier is pre-controlled to be displayed with a first display parameter. After determining the sub-identifier through step S430, the sub-identifier is controlled to be displayed with a second display parameter different from the first display parameter. In the present implementation manner, the first display parameter includes a first transparency parameter, and the second display parameter includes a second transparency parameter. The second display parameter different from the first display parameter is a second display parameter including the second transparency parameter different from the first transparency parameter. In other implementation manners, the first display parameter and the second display parameter may also include other types of parameters, as long as the values of the parameters can be adjusted to have different display effects.

In an optional implementation manner, the target virtual object includes type information. For example, the type information includes: enemy characters and teammate characters. Further, the operation that the sub-identifier is controlled to be displayed with a second display parameter different from the first display parameter further includes that: the sub-identifier is controlled to be displayed with the corresponding color parameter according to the types of the target virtual object. The second display parameter includes a color parameter, and a correspondence relationship between a target virtual object type and a color parameter is established in advance. In specific implementation, after the target virtual object is determined, first type information of the target virtual object is acquired, a color parameter in the second display parameter is determined according to the correspondence relationship between the target virtual object type and the color parameter and the first type information, and the sub-identifier is controlled to be displayed with the corresponding color parameter. For example, the color parameter corresponding to the enemy character is red, and the color parameter corresponding to the teammate character is not red.

By means of the above implementation manner, the sub-identifier is controlled to be displayed through different color parameters to identify the type of the target virtual object corresponding to the sub-identifier, which can better indicate the information of the target virtual object, not only indicating the position information of the target virtual object in the game, but also indicating the type information of the target virtual object. In this way, the player can be given with a clearer indication.

Figure 12:
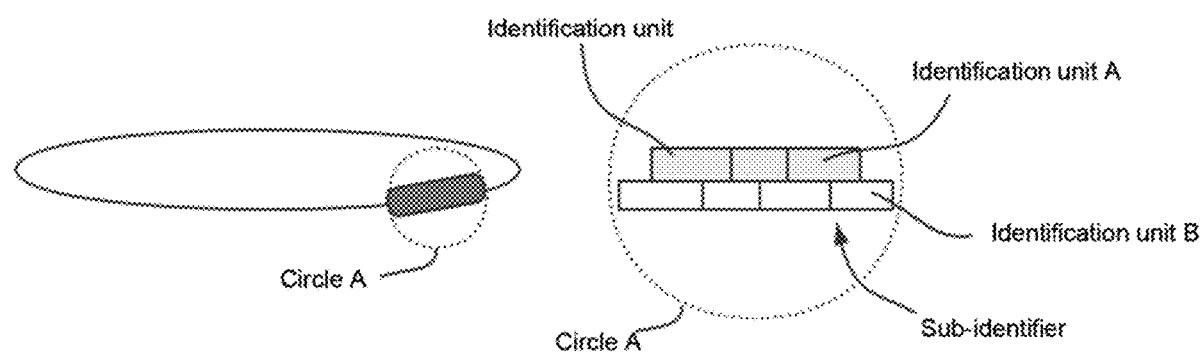
FIG. 12 is a schematic diagram of an identification unit according to an embodiment of the application.

As shown in FIG. 12, in an optional implementation manner, the sub-identifier includes multiple identification units, and each identification unit represents a preset number of target virtual objects corresponding to the sub-identifier. The method further includes that: a target number of the target virtual object corresponding to the sub-identifiers is determined, and a corresponding number of the identification units is controlled to be displayed according to the target number. For example, if it is determined that the number of target virtual objects that satisfy the prompt trigger event is 5, and it is determined that the sub-identifiers corresponding to the five first position information of the five target virtual objects are the same sub-identifier, the number of the identification units is 5, that is, the five identification units are displayed graphically to indicate that the player has five target virtual objects at the position corresponding to the first orientation information in the game.

By means of the above implementation manner, the number of identification units constituting a specific sub-identifier can be dynamically adjusted, and the number of target virtual objects at a specific position in the game can be reflected in real time to give the player with a better operation experience.

In an optional implementation manner, the second display parameter or the third display parameter that controls the display of the sub-identifier corresponding to the target virtual object further includes saturation. The first orientation information further includes distance information of the target virtual object and the virtual character. The correspondence relationship between the saturation and the distance information is set in advance. The operation that the sub-identifier is controlled to be displayed with the second display parameter different from the first display parameter further includes that: the sub-identifier is controlled to be displayed with corresponding saturation according to the distance information of the target virtual object and the virtual character. In specific implementation, after determining the first position information of the target virtual object, the distance information in the first position information is acquired, the saturation in the second display parameter is determined according to the distance information and the preset correspondence relationship between the saturation and the distance information, and the sub-identifier is controlled to be displayed with corresponding saturation. It is to be noted that when controlling the display of the identification units constituting the sub-identifier, the above-mentioned content about controlling the sub-identifier to be displayed with the corresponding saturation according to the distance information of the target virtual object and the virtual character is also applicable. Therefore, details are not described herein. Similarly, the above implementation manner is also applicable to the step of controlling the sub-identifier to be displayed with a third display parameter different from the first display parameter and the second display parameter, and therefore, details are not described herein. Of course, it is also possible to identify the distance between the target virtual object and the virtual character by adjusting other parameter information, for example, brightness and color information, as shown in an identification unit A and an identification unit B in FIG. 12. The distance between the target virtual object and the virtual character corresponding to the identification unit A is greater than the distance between the target virtual object and the virtual character corresponding to the identification unit B.

By means of the above implementation manner, by adjusting the saturation of the sub-identifier or the identification units constituting the sub-identifier in real time according to the distance information between the target virtual object and the virtual character, the moving state of the target virtual object in the game can be reflected in real time, the situation of the target virtual object in the game can be more accurately indicated, and the player is given with a better operating experience.

In an optional implementation manner, the method provided in the application further includes the following step. In step S470, in response to a control instruction, the graphical user interface is controlled to switch from a first game screen to a second game screen, the second game screen being a game screen determined according to second orientation information corresponding to the sub-identifier in the game scene. The control instruction is an instruction triggered by receiving a control operation acting on the terminal. For example, the control operation may be a touch operation, a suspension operation implemented by a sensor, or an operation applied through a physical input setting. In the present implementation manner, the response control instruction may be implemented by the following steps.

In step S13701, a touch operation acting on a touch screen is received.

In step S13703, a control instruction is triggered when it is determined that the touch operation satisfies a parameter threshold.

In the present implementation manner, the parameter threshold is that a touch position of the touch operation is within a range corresponding to the sub-identifier. In other implementation manners, the parameter threshold is the number of touch operations within a preset duration. For example, if two touch operations are detected within a preset time, it is determined that the touch operation satisfies the parameter threshold, and the control instruction is triggered.

By means of the above implementation manner, when a player detects a sound source or is attacked, by applying a touch operation on the touch screen, a first game screen displayed on the graphical user interface is controlled to be switched to a second game screen determined according to the second orientation information corresponding to the sub-identifier, so that the player can quickly position the target virtual object on the graphical user interface, a new interactive experience and game functions are provided for the player, and the player experience is improved.

Figure 14:
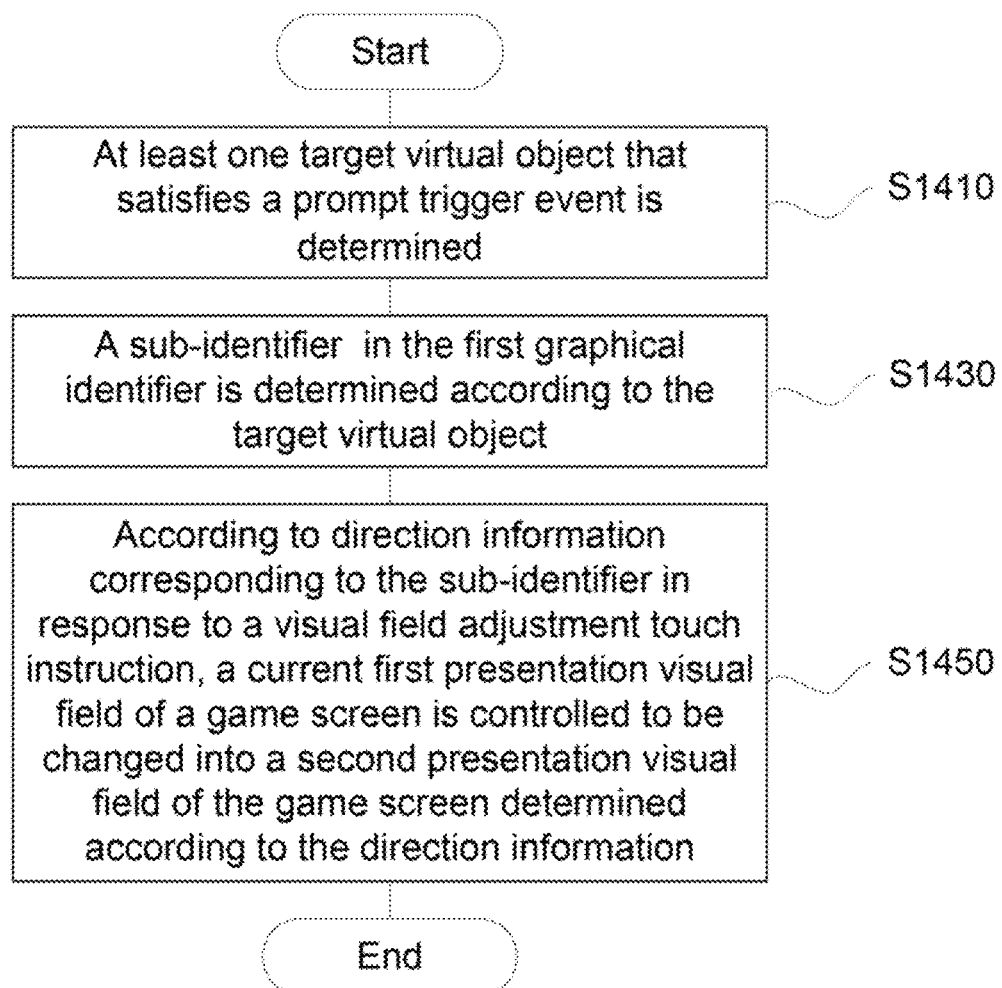
FIG. 14 is a flowchart of a game character control method according to an embodiment of the application.

As shown in FIG. 14, an embodiment of the application also provides a game character control method, applied to a touch terminal capable of presenting a graphical user interface. The graphical user interface includes a virtual character and at least part of a game scene. The method includes the following steps.

In step S1410, at least one target virtual object that satisfies a prompt trigger event is determined.

In step S1430, a sub-identifier corresponding to the target virtual object in the first graphical identifier is determined, wherein the prompt trigger event is displayed graphically on the graphical user interface through the sub-identifier.

In step S1450, in response to a visual field adjustment touch instruction, according to direction information corresponding to the sub-identifier, a current first presentation visual field of a game screen is controlled to be changed into a second presentation visual field of the game screen determined according to the direction information.

By means of the above implementation manner, after determining a target virtual object that satisfies a prompt trigger event, a sub-identifier corresponding to the target virtual object is controlled to be displayed on a graphical user interface, game content presented in a game screen is further determined according to direction information corresponding to the sub-identifier after detecting a visual field adjustment touch instruction, the game screen is used as a second presentation visual field, and a current first presentation visual field of the game screen is controlled to be adjusted to the second presentation visual field. In this way, a player can quickly find the target virtual object on the graphical user interface, and a brand-new interaction mode and game experience are provided for the player.

Specifically, in step S1410, the related content that satisfies the prompt trigger event in step S310 is also applicable to the content that satisfies the prompt trigger event in step S1410. It is to be noted that the technical solution directly or indirectly related to the satisfaction of the prompt trigger event described in the foregoing is also applicable to the related content that satisfies the prompt trigger event in the present implementation manner without causing a logical contradiction. Similarly, at least one target virtual object that satisfies the prompt trigger event in step S310 is also applicable to at least one target virtual object that satisfies the prompt trigger event in step S1410. It is to be noted that the technical solution directly or indirectly related to at least one target virtual object that satisfies the prompt trigger event described in the foregoing is also applicable to the related content of at least one target virtual object that satisfies the prompt trigger event in the present implementation manner without causing a logical contradiction. In step S1430, the sub-identifier corresponding to the target virtual object may be a sub-identifier corresponding to a game parameter of the target virtual object in the game. For example, the game parameter may be an orientation parameter, a direction parameter, a movement parameter, etc. In an optional implementation manner, the operation that the sub-identifier corresponding to the target virtual object in the first graphical identifier is determined may be performed by the following manners.

In step S14301, first orientation information of the target virtual object is acquired.

In step S14303, a sub-identifier corresponding to the first orientation information in the first graphical identifier is determined.

By means of the above implementation manner, the corresponding sub-identifier in the first graphical identifier is determined according to the first orientation information of the target virtual object, and the sub-identifier is visually displayed on the graphical user interface, so that the orientation of the target virtual object in the game is indicated by the sub-identifier on the graphical user interface.

In step S1450, in response to a visual field adjustment touch instruction, according to direction information corresponding to the sub-identifier, a current first presentation visual field of a game screen is controlled to be changed into a second presentation visual field of the game screen determined according to the direction information.

Figure 15:
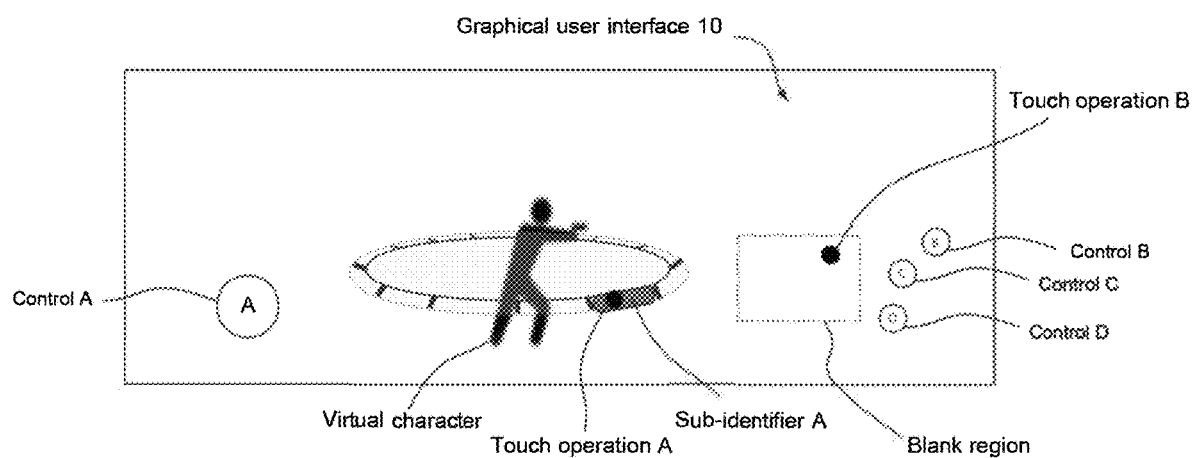
FIG. 15 is a schematic diagram of a preset operation region according to an embodiment of the application.

As shown in FIG. 15, in an optional implementation manner, the visual field adjustment touch instruction is an instruction issued in response to a first control operation acting on the electronic device. The visual field adjustment touch instruction may control to change the presentation visual field of the game screen. The first control operation may be a touch operation, a suspension operation implemented by a sensor, or an operation applied through a physical input setting. In an optional implementation manner, the operation of responding to the visual field adjustment touch instruction may be performed by the following step that: a touch operation acting on a preset touch region is received, and a corresponding control instruction is triggered. In the present implementation manner, the preset touch region is a region on the graphical user interface corresponding to the sub-identifier corresponding to the target virtual object, such as a region corresponding to the sub-identifier A shown in FIG. 15. In other implementation manners, the preset touch region is a blank region on the graphical user interface. The blank region refers to a region in the graphical user interface that does not coincide with a function trigger region. The function trigger region may be a region corresponding to a visible control or a non-visible region corresponding to a specific function, such as a dotted box region shown in FIG. 15. In the present implementation manner, the touch operation is a touch operation acting on the preset touch region and satisfying a preset duration. For example, the operation that a touch operation acting on the preset touch region is received to trigger a corresponding control instruction may be that: it is determined that a touch operation is received in a region of a sub-control, such as a touch operation A shown in FIG. 15; and a duration of the touch operation is acquired, and a control instruction is triggered when the duration exceeds a preset duration. The operation that a touch operation acting on the preset touch region is received to trigger a corresponding control instruction may also be that: it is determined that a touch operation is received in a blank region on the graphical user interface, such as a touch operation B shown in FIG. 15; and a duration of the touch operation is acquired, and a control instruction is triggered when the duration exceeds a preset duration.

In other implementation manners, the touch operation is a touch operation acting on the preset touch region and satisfying a preset pressure value. For example, the operation that a touch operation acting on the preset touch region is received to trigger a corresponding control instruction may be that: it is determined that a touch operation is received in a region of a sub-control, a current pressure value of the touch operation is acquired, and a control instruction is triggered when the current pressure value exceeds a preset pressure value. The operation that a touch operation acting on the preset touch region is received to trigger a corresponding control instruction may also be that: it is determined that a touch operation is received in a blank region on the graphical user interface, a current pressure value of the touch operation is acquired, and a control instruction is triggered when the current pressure value exceeds a preset pressure value.

In other implementation manners, the touch operation is a click operation acting on the preset touch region within a preset duration and satisfying a preset number. For example, the touch operation is a double-click operation or a single-click operation. For example, the operation that a touch operation acting on the preset touch region is received to trigger a corresponding control instruction may be that: it is determined that a touch operation is received in a blank region on the graphical user interface, it is determined that the number of click operations received within a preset duration satisfies a preset number, for example, a double-click operation, and a control instruction is triggered. The operation that a touch operation acting on the preset touch region is received to trigger a corresponding control instruction may be that: it is determined that a touch operation is received in a region of a sub-control, it is determined that the number of click operations received within a preset duration satisfies a preset number, for example, a double-click operation, and a control instruction is triggered.

Figure 16:
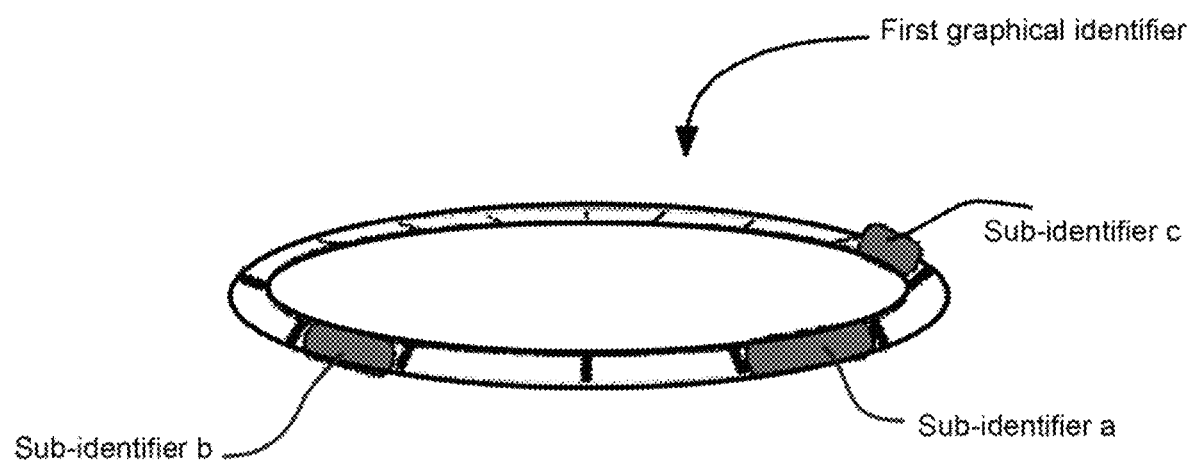
FIG. 16 is a schematic diagram of determining a sub-identifier with a higher priority according to an embodiment of the application.

The direction information corresponding to the sub-identifier is the direction information of the sub-identifier corresponding to the target virtual object that satisfies a priority order. It is to be noted that there may be multiple virtual objects and virtual resources in the game scene. The target virtual object refers to a virtual object or virtual resource that satisfies the prompt trigger event. In the present implementation manner, the parameters that affect the priority order include determination time of determining the target virtual object. For example, the direction information of the sub-identifier corresponding to the target virtual object that satisfies the priority order is the direction information of the sub-identifier corresponding to the target virtual object corresponding to the determination time that satisfies a preset time sequence. The preset time sequence is the last determination time determined according to the time sequence. For example, the determination time includes 10:31, 10:33, and 10:35. Then the last determination time determined according to the time sequence is 10:35. It is to be noted that a preset time sequence may also be another sequence determined according to actual needs. For example, as shown in FIG. 16, a sub-identifier a in the first graphical identifier corresponds to a target virtual object a, a sub-identifier b in the first graphical identifier corresponds to a target virtual object b, and a sub-identifier c in the first graphical identifier corresponds to a target virtual object c. The determination time of the target virtual object a is 10:00, the determination time of the target virtual object b is 10:05, and the determination time of the target virtual object c is 10:10. Then the direction information corresponding to the sub-identifier in step S1450 is direction information corresponding to the sub-identifier c corresponding to the target virtual object c. In the present implementation manner, the steps of the game character control method provided in the application may be implemented by the following manner: recording the determination time of the target virtual object. Step S1450 may be performed by the following manners.

A visual field adjustment control instruction is responded.

Determination time of at least one target virtual object is acquired.

Determination time that satisfies a preset time sequence is determined.

Direction information corresponding to a sub-identifier corresponding to a target virtual object corresponding to the determination time that satisfies the preset time sequence is acquired, and a current first presentation visual field of the game screen is controlled to be changed into a second presentation visual field of the game screen determined according to the direction information.

In other implementation manners, the parameters that affect the priority order include the type of the prompt trigger event. For example, the direction information of the sub-identifier corresponding to the target virtual object that satisfies the priority order is the direction information of the sub-identifier corresponding to the target virtual object corresponding to the type of the prompt trigger event that satisfies the preset priority order. The type of the prompt trigger event includes a sound source type and/or a type of performing a preset operation on the virtual character. For example, the sound source type may include: a footstep sound, a gun sound and a breaking sound, the type of performing a preset operation on the virtual character may include: shootings, broadswords, etc., and the priority of the footstep sound is greater than the priority of the breaking sound. It is to be noted that the preset priority order may be an order determined according to actual needs. In the present implementation manner, step S1450 may be performed by the following manners.

A visual field adjustment control instruction is responded.
The type of at least one prompt trigger event is acquired.
The type of the prompt trigger event that satisfies a preset priority order is determined.

Direction information corresponding to a sub-identifier corresponding to a target virtual object corresponding to the type of the prompt trigger event that satisfies the preset priority order is acquired, and a current first presentation visual field of the game screen is controlled to be changed into a second presentation visual field of the game screen determined according to the direction information.

In other implementation manners, the parameters that affect the priority order may also include an attribute type of the target virtual object. The attribute type may be a professional attribute of the target virtual object, such as warriors and mages. Of course, the type of prompt may also be another type determined according to other requirements. For example, the direction information of the sub-identifier corresponding to the target virtual object that satisfies the priority order is the direction information of the sub-identity corresponding to the target virtual object corresponding to the attribute type of the target virtual object that satisfies the preset priority order.

It is to be noted that the direction information corresponding to the sub-identifier may also be the direction information corresponding to the sub-identifier determined according to a method defined by the player or predetermined by a game developer.

By means of the above implementation manner, it is possible to control a target visual object with a higher priority in a presentation visual field displayed by a game screen. Since the target virtual object with the higher priority has a greater influence on a game result during a battle game. Therefore, the present implementation manner enables the player to quickly learn about the target virtual object in the game scene, reduces the player's input of more invalid operations, further reduces the data rendering pressure of the electronic device, further brings savings in power consumption, and improves the user experience.

Figure 17A:
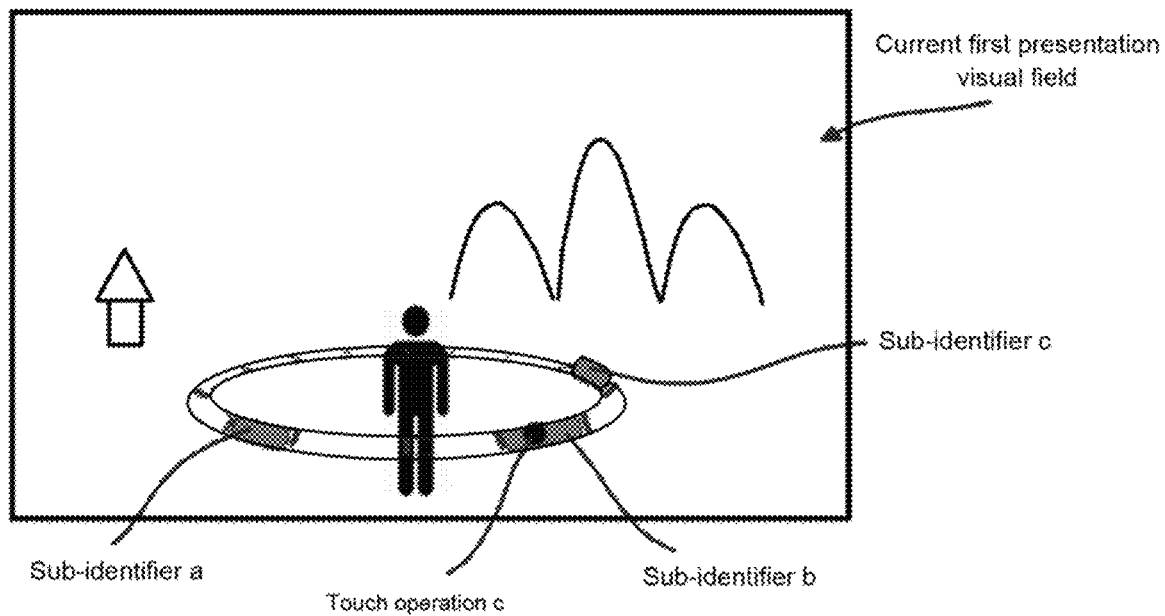
FIG. 17A and FIG. 17B are schematic diagrams of adjusting a presentation visual field in response to a visual field adjustment touch instruction according to an embodiment of the application.
Figure 17B:
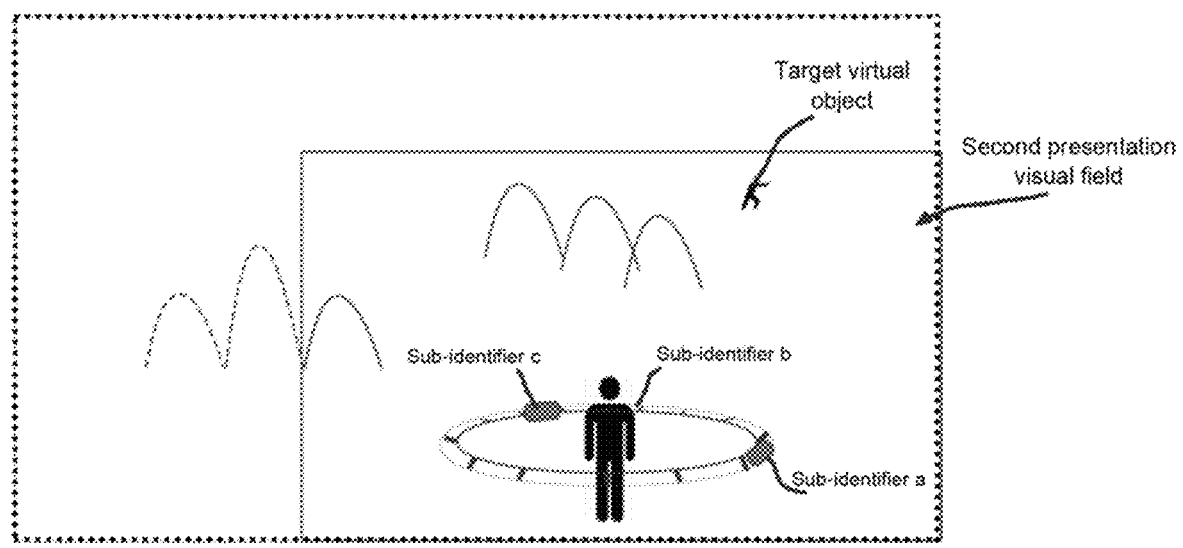

Regarding step S1450 in which the current first presentation visual field of the game screen is controlled to be changed into a second presentation visual field of the game screen determined according to the direction information. The content presented in the game screen is a screen obtained by rendering the content captured by a virtual camera in the game. The orientation of the virtual camera is adjusted according to the direction information corresponding to the sub-identifier, and then a second presentation visual field of the game screen is obtained by rendering the content captured by the orientation-adjusted virtual camera. FIG. 17A shows the current first presentation visual field of the game screen. In this game scene, a sub-identifier a, a sub-identifier b and a sub-identifier c in the first graphical identifier respectively correspond to at least one target virtual object, and are used to indicate the position situation of the target virtual object in the game, and respond to a touch operation C for triggering a visual field adjustment touch instruction. The touch operation C acts on a region corresponding to the sub-identifier b, acquires direction information corresponding to the sub-identifier b, and determines, according to the direction information, a second presentation visual field of the game screen. As shown in FIG. 17B, the second presentation visual field includes a target virtual object corresponding to the sub-identifier b. This manner enables the player to quickly find the target virtual object in the graphical user interface, provides the player with a brand new interaction method and game experience, reduces the player's input of more invalid operations, further reduces the data rendering pressure of the electronic device, further brings savings in power consumption, and improves the user experience.

In an optional implementation manner, the orientation of the virtual camera is bound to the orientation of the virtual character. During the running of the game, the orientation of the virtual camera is changed by changing the orientation of the virtual character. Further, the content presented in the game screen is changed, that is, the presentation visual field of the game screen is changed, but it is to be noted that changing the presentation visual field does not necessarily result in the change of the orientation of the virtual character. In an optional implementation manner, changing the presentation visual field simultaneously changes the orientation of the virtual character.

In an optional implementation manner, changing the presentation visual field does not change the orientation of the virtual character. Further, in the implementation manner, after step S1450, the game character control method further includes the following steps: the current orientation of the virtual character is adjusted to the orientation corresponding to the second presentation visual field of the game screen in response to an orientation adjustment trigger event. The orientation adjustment event is a trigger condition for controlling the change of the orientation of the virtual character. In the present implementation manner, the orientation adjustment event is a second control operation that satisfies an operation parameter threshold. The operation parameter may be a pressing pressure threshold of the control operation. The operation parameter may also be an operation duration threshold of the control operation, for example, a duration threshold of touching the graphical user interface. The operation parameter may also be the number of control operations, such as double click. It is to be noted that the second control operation may be an operation that is independent of the first control operation, or may be an operation that is continuous with the first control operation, and may be specifically determined according to the settings of the developer or the player. For example, the first control operation is a touch operation acting on the preset touch region and satisfying a preset duration, and the second control operation is an operation that satisfies an operation duration threshold of the control operation. When the second control operation is an operation independent of the first control operation, in specific implementation, after determining a touch operation acting on the preset touch region and exceeding the preset duration, that is, in response to a visual field adjustment touch instruction, the current first presentation visual field of the game screen is controlled to be changed into a second presentation visual field. After determining the end of the first control operation, an operation that satisfies an operation duration threshold of the control operation is re-determined. That is, in response to an orientation adjustment trigger event, the current orientation of the virtual character is adjusted to an orientation corresponding to the second presentation visual field of the game screen. When the second control operation is an operation continuous with the first control operation, in specific implementation, after determining a touch operation acting on the preset touch region and exceeding the preset duration, that is, in response to a visual field adjustment touch instruction, the current first presentation visual field of the game screen is controlled to be changed into a second presentation visual field. An operation that satisfies an operation duration threshold of the control operation is re-determined. That is, in response to an orientation adjustment trigger event, the current orientation of the virtual character is adjusted to an orientation corresponding to the second presentation visual field of the game screen. In other implementation manners, the orientation adjustment event may also be defined in advance according to actual needs or defined according to player settings.

In other implementation manners, after step S1450, the game character control method further includes the following steps: the current orientation of the virtual character is adjusted to the orientation corresponding to the second presentation visual field of the game screen in response to a release operation. The release operation is an operation corresponding to the touch operation, that is, the release operation is an operation to release the touch operation. In the present implementation manner, when it is detected that a touch point of the touch operation disappears, it is determined that the release operation is received. For example, if the operation of the player touching the graphical user interface with a finger is the touch operation, when the finger leaves the graphical user interface, it is determined to be the release operation. In other implementation manners, the release operation is an operation that satisfies an operation parameter threshold. For example, when it is further detected that the pressure value of the touch operation satisfies a pressure threshold after the touch operation is received, it is determined to be the release operation. It is to be noted that the release operation may be an operation continuous with the touch operation, or may be an operation independent of the touch operation.

By means of the above implementation manner, the orientation of the virtual character is controlled to be changed, so that the orientation of the virtual character is consistent with the second presentation visual field presented on the game screen, the player can control the virtual character to perform game operations, such as shooting, and a novel gameplay and interaction mode may be provided for the player. This implementation manner also enables the player to quickly control the virtual character to respond to the target virtual object in the game scene, reduces the player's input of more invalid operations, further reduces the data rendering pressure of the electronic device, further brings savings in power consumption, and improves the user experience.

In an optional implementation manner, after step 1450, the game character control method further includes the following steps: in response to a release operation, the second presentation visual field of the game screen is restored to a state before responding to the visual field adjustment touch instruction. The release operation is an operation corresponding to the touch operation, the content of the release operation is consistent with the corresponding part in the foregoing, and therefore, details are not described herein.

It is to be noted that the restoration of the state of the second presentation visual field to the state before responding to the visual field adjustment touch instruction in the application includes: controlling the second presentation visual field of the game screen on the graphical user interface to restore to the first presentation visual field before responding to the visual field adjustment touch instruction; or, controlling the second presentation visual field of the game screen on the graphical user interface to restore to the presentation visual field calculated according to the presentation visual field calculation logic before responding to the visual field adjustment touch instruction.

The second presentation visual field of the game screen on the graphical user interface is controlled to restore to the first presentation visual field before responding to the visual field adjustment touch instruction, that is, the presentation visual field range is absolutely restored to the state before responding to the visual field adjustment touch instruction: an absolute position and absolute angle/direction of the virtual camera on the game screen are restored to the state before responding to the visual field adjustment touch instruction. For example, before responding to the visual field adjustment touch instruction, the position of the virtual camera is a point A in the absolute coordinates of the game scene, and a shooting direction is a direction vector AO. The presentation visual field range is absolutely restored to the state before responding to the visual field adjustment touch instruction to perform absolute restoration based on the point A and the direction AO, that is, the presentation visual field of the game screen on the graphical user interface is controlled based on the position of the virtual camera in the absolute coordinates of the game scene and the shooting direction in the absolute coordinates before responding to the visual field adjustment touch instruction.

The second presentation visual field of the game screen on the graphical user interface is controlled to restore to the presentation visual field calculated according to the presentation visual field adjustment touch instruction before responding to the visual field adjustment touch instruction, that is, the visual field is restored to a control state before responding to the visual field adjustment touch instruction. For example, before responding to the visual field adjustment touch instruction, the game calculates the visual field according to predetermined calculation logic (for example, the virtual camera is arranged at the head of the virtual character, and the orientation rotates with the rotation of the virtual character). In such case, the restoration of the presentation visual field to the state before responding to the visual field adjustment touch instruction in the application may also be the restoration using the calculation logic before responding to the visual field adjustment touch instruction to calculate the visual field. For example, before responding to the visual field adjustment touch instruction, the position of the virtual camera is a point A (for example, a point with a distance of W and a height of H behind the virtual character) in the relative coordinates associated with the virtual character, and the shooting direction is a direction vector AO, which is associated with the orientation of the virtual character and/or a weapon sight direction (for example, a projection of the direction vector AO in a horizontal direction is the same as the orientation of the virtual character in the horizontal direction). During the restoration, the position of the virtual camera is still at the point with a distance of W and a height of H behind the virtual character. The shooting direction of the virtual camera is associated with the orientation of the virtual character and/or the weapon sight direction. That is, the presentation visual field of the game screen on the graphical user interface is controlled based on the current position of the virtual character in the absolute coordinates of the game scene, the current orientation of the virtual character and/or the weapon sight direction of the virtual character, the position relationship between the virtual camera in the game scene before responding to the visual field adjustment touch instruction, and an association relationship between the orientation of the virtual character before responding to the visual field adjustment touch instruction and/or the weapon sight direction of the virtual character and the shooting direction of the virtual camera.

The scope of protection claimed in the application shall include at least the above two cases.

Figure 18:
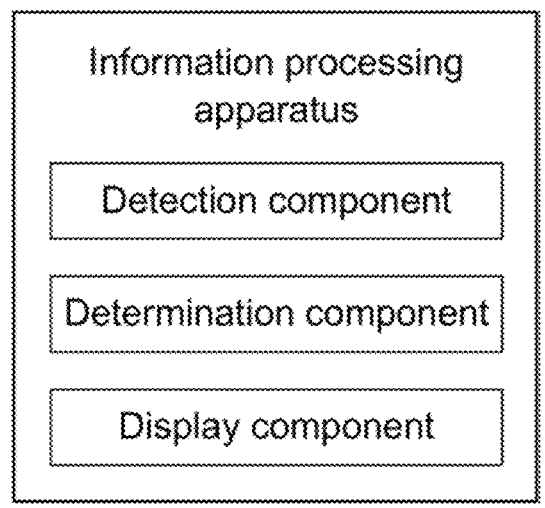
FIG. 18 is a composition diagram of an information processing apparatus according to an embodiment of the application.

As shown in FIG. 18, an exemplary embodiment further discloses an information processing apparatus. The apparatus includes: a detection component, a determination component and a display component.

The detection component is configured to determine first orientation information of at least one target virtual object that satisfies a prompt trigger event in the game scene.

The determination component is configured to determine a sub-identifier corresponding to the first orientation information in a first graphical identifier. The first graphical identifier is set around the virtual character.

The display component is configured to display the prompt trigger event graphically on the graphical user interface through the sub-identifier.

Figure 19:
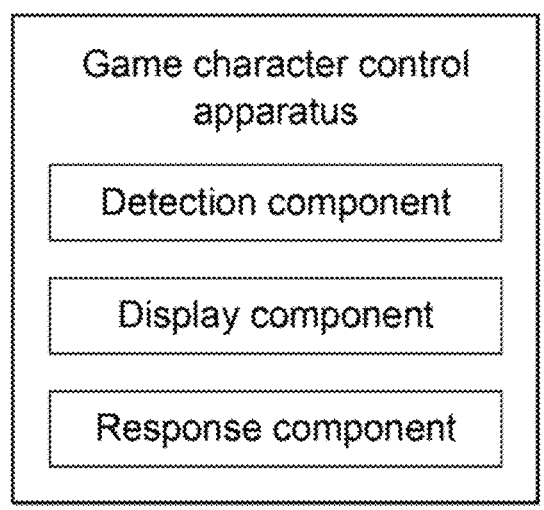
FIG. 19 is a composition diagram of a game character control apparatus according to an embodiment of the application.

As shown in FIG. 19, an exemplary embodiment further discloses a game character control apparatus. The apparatus includes: a detection component, a display component and a response component.

The detection component is configured to determine at least one target virtual object that satisfies a prompt trigger event.

The display component is configured to determine a corresponding sub-identifier on a graphical user interface according to the target virtual object.

The response component is configured to control, according to direction information corresponding to the sub-identifier in response to a visual field adjustment touch instruction, a current first presentation visual field of a game screen displayed in the graphical user interface to be changed into a second presentation visual field of the game screen determined according to the direction information.

Specific details of various components in the above embodiment have been described in detail in the corresponding information processing method and game character control method. In addition, it can be understood that the information processing apparatus further includes other components corresponding to the information processing method and the game character control apparatus further includes other components corresponding to the game character control method. Therefore, detail descriptions are omitted herein.

It is to be noted that although several components of the device for action execution are mentioned in the above detailed description, such division is not mandatory. In fact, according to the implementation manners of the disclosure, the features and functions of two or more components described above may be embodied in one component. Conversely, the features and functions of one component described above may be further divided into multiple components and embodied.

Figure 20:
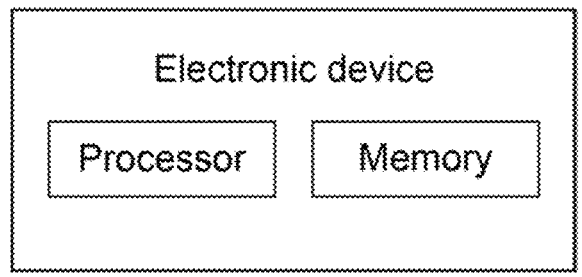
FIG. 20 is a composition diagram of an electronic device according to an embodiment of the application.

FIG. 20 is a structure schematic diagram of an electronic device according to an embodiment of the disclosure. As shown in FIG. 20, the electronic device of the present embodiment includes: a memory and a processor. The memory and the processor may be connected by a bus. A software application is executed on a processor of the electronic device, and rendering is performed on a display device of the electronic device to obtain a graphical user interface.

In an optional implementation manner, the processor is configured to implement, by executing an executable instruction, the following steps that: first orientation information of at least one target virtual object that satisfies a prompt trigger event in the game scene is determined; a sub-identifier corresponding to the first orientation information in a first graphical identifier is determined, the first graphical identifier being set around the virtual character; and the prompt trigger event is displayed graphically on the graphical user interface through the sub-identifier.

Optionally, the first graphical identifier is a game model arranged in the game scene, or a control identifier arranged in the graphical user interface.

Optionally, at least one target virtual object that satisfies a prompt event is a sound source within a preset range determined according to the virtual character.

Optionally, at least one target virtual object that satisfies a prompt event is a virtual object that performs a preset operation on the virtual character.

Optionally, the first graphical identifier includes at least two sub-identifiers, the sub-identifiers being used to prompt orientation information of the target virtual object; and each of the sub-identifiers includes at least two display positions, the display positions being set around the virtual character at a preset height interval.

Optionally, the sub-identifier includes multiple identification units. The method further includes that: a target number of the target virtual object corresponding to the sub-identifiers is determined, and a corresponding number of the identification units is controlled to be displayed according to the target number.

Optionally, the first graphical identifier includes at least two sub-identifiers, and a display size of the sub-identifier is determined according to a position relationship between the sub-identifiers and the virtual character.

Optionally, a correspondence relationship of the sub-identifier and relative orientation information of the virtual character is pre-established; the first orientation information is a relative position relationship of the target virtual object and the virtual character; and the operation that a sub-identifier corresponding to the first orientation information in a first graphical identifier is determined is that: the sub-identifier corresponding to the first orientation information is determined according to the first orientation information and the correspondence relationship.

Optionally, the first orientation information includes at least one of the following information: height information and direction information on a horizontal plane.

Optionally, the first graphical identifier includes a basic graphical identifier and a height graphical identifier, the basic graphical identifier being displayed on the graphical user interface with a first display parameter, and the height graphical identifier being displayed with a second display parameter.

Optionally, the operation that the prompt trigger event is displayed graphically on the graphical user interface through the sub-identifier is that: the sub-identifier is controlled to be displayed with a third display parameter different from the first display parameter and the second display parameter.

Optionally, the types of the target virtual object include: enemy characters and teammate characters; the third display parameter includes a color parameter; and the operation that the sub-identifier is controlled to be displayed with a third display parameter different from the first display parameter and the second display parameter includes that: the sub-identifier is controlled to be displayed with the corresponding color parameter according to the types of the target virtual object.

Optionally, the first graphical identifier includes at least two sub-identifiers, the sub-identifiers being used to prompt orientation information of the target virtual object; and each of the sub-identifiers includes at least two display positions, the display positions being set around the virtual character at a preset horizontal interval.

Optionally, a correspondence relationship between the sub-identifier and relative orientation information of the virtual character is pre-established; the first orientation information is a relative position relationship between the target virtual object and the virtual character; and the operation that a sub-identifier corresponding to the first orientation information in a first graphical identifier is determined is that: the sub-identifier corresponding to the first orientation information is determined according to the first orientation information and the correspondence relationship, the first orientation information including direction information on a horizontal plane.

Optionally, the first graphical identifier is pre-controlled to be displayed with a first display parameter; and the operation that the prompt trigger event is displayed graphically on the graphical user interface through the sub-identifier is that: the sub-identifier is controlled to be displayed with a second display parameter different from the first display parameter.

Optionally, the types of the target virtual object include: enemy characters and teammate characters; the second display parameter includes a color parameter; and the operation that the sub-identifier is controlled to be displayed with a second display parameter different from the first display parameter includes that: the sub-identifier is controlled to be displayed with the corresponding color parameter according to the types of the target virtual object.

Optionally, the method further includes that: in response to a control instruction, the graphical user interface is controlled to switch from a first game screen to a second game screen, the second game screen being a game screen determined according to second orientation information corresponding to the sub-identifier in the game scene.

By means of the electronic device provided in the application, a first graphical identifier is set around a virtual character. The first graphical identifier includes multiple sub-identifiers, each of which corresponds to different directions. When a target virtual object that satisfies a prompt trigger event is detected, first orientation information of the target virtual object is acquired, and a sub-identifier corresponding to the first orientation information in the first graphical identifier is determined, and the sub-identifier is further displayed on the graphical user interface to display a corresponding prompt trigger event. In this way, a sub-identifier set around a virtual character may clearly and comprehensively correspond to a spatial position of a target virtual object in a game scene, so that a user can intuitively understand the position of the target virtual object in a game.

In an optional implementation manner, the processor is configured to execute the executable instruction to implement the following steps:

at least one target virtual object that satisfies a prompt trigger event is determined;

a sub-identifier corresponding to the target virtual object in the first graphical identifier is determined, wherein the prompt trigger event is displayed graphically on the graphical user interface through the sub-identifier; and according to direction information corresponding to the sub-identifier in response to a visual field adjustment touch instruction, a current first presentation visual field of a game screen is controlled to be changed into a second presentation visual field of the game screen determined according to the direction information.

Optionally, at least one target virtual object that satisfies a prompt trigger event is at least one of the following: a sound source within a preset range determined according to the virtual character and a virtual object for performing a preset operation on the virtual character.

Optionally, the first graphical identifier includes at least two sub-identifiers, wherein the first graphical identifier is set around the virtual character.

Optionally, the operation that a sub-identifier corresponding to the target virtual object in the first graphical identifier is determined includes that:

first orientation information of the target virtual object is acquired; and a corresponding sub-identifier on the graphical user interface is determined according to the first orientation information.

Optionally, a correspondence relationship between the sub-identifier and relative orientation information of the virtual character is pre-established; the first orientation information is a relative position relationship between the target virtual object and the virtual character; and the operation that a corresponding sub-identifier on the graphical user interface is determined according to the first orientation information is that: the corresponding sub-identifier on the graphical user interface is determined according to the first orientation information and the correspondence relationship.

Optionally, the first orientation information includes at least one of the following information: height information and direction information on a horizontal plane.

Optionally, the step of responding to a visual field adjustment touch instruction is to receive a touch operation acting on a preset touch region and trigger a corresponding control instruction.

Optionally, the preset touch region includes at least one of the following regions:
 a region corresponding to the sub-identifier corresponding to the target virtual object; and
 a blank region on the graphical user interface.

Optionally, the touch operation is at least one of the following: a touch operation acting on the preset touch region and meeting a preset duration;
 a touch operation acting on the preset touch region and meeting a preset pressure value; and
 a click operation acting on the preset touch region within a preset duration and meeting a preset number.

Optionally, after a current first presentation visual field of the game screen is controlled to be changed into a second presentation visual field of the game screen determined according to the direction information, the method further includes that:
 in response to a release operation, the second presentation visual field of the game screen is restored to a state before responding to the visual field adjustment touch instruction, the release operation being an operation corresponding to the touch operation; or,
 in response to an orientation adjustment trigger event, the current orientation of the virtual character is adjusted to an orientation corresponding to the second presentation visual field of the game screen.

Optionally, after a current first presentation visual field of the game screen is controlled to be changed into a second presentation visual field of the game screen determined according to the direction information, the method further includes that:
 in response to a release operation, the current orientation of the virtual character is adjusted to an orientation corresponding to the second presentation visual field of the game screen, the release operation being an operation corresponding to the touch operation.

Optionally, the method further includes that: determination time of the target virtual object is recorded; and The direction information corresponding to the sub-identifier is direction information of the sub-identifier corresponding to the target virtual object corresponding to determination time that satisfies a preset time sequence.

By means of the electronic device provided by the application, after determining a target virtual object that satisfies a prompt trigger event, a sub-identifier corresponding to the target virtual object is controlled to be displayed on a graphical user interface, game content presented in a game screen is further determined according to direction information corresponding to the sub-identifier after detecting a visual field adjustment touch instruction, the game screen is used as a second presentation visual field, and a current first presentation visual field of the game screen is controlled to be adjusted to the second presentation visual field. In this way, a player can quickly find the target virtual object in the graphical user interface, and a brand-new interaction mode and game experience are provided for the player.

In an alternative implementation manner, the electronic device may further include one or more processors, and a memory resource represented by the memory and configured to store an instruction executable by a processing component, such as an application program. The application program stored in the memory may include one or more components each corresponding to a set of instructions. In addition, the processing component is configured to execute instructions to perform the above-described information processing method.

The electronic device may also include: a power supply component, configured to perform power management on the electronic device; a wired or wireless network interface, configured to connect the electronic device to a network; and an input output (I/O) interface. The electronic device may operate based on an operating system stored in the memory, such as Android, iOS, Windows, Mac OS X, Unix, Linux, FreeBSD, or the like.

Figure 21:
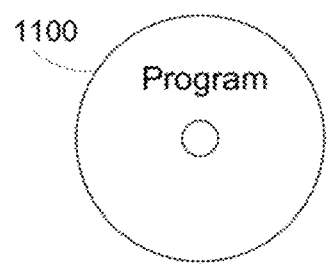
FIG. 21 is a structure schematic diagram of a computer-readable storage medium according to an embodiment of the disclosure.

FIG. 21 is a structure schematic diagram of a computer-readable storage medium according to an embodiment of the disclosure. As shown in FIG. 21, a program product 1100 according to an implementation manner of the application is described. A computer program is stored thereon. In an optional implementation manner, the computer program is executed by a processor to implement the following steps that: first orientation information of at least one target virtual object that satisfies a prompt trigger event in the game scene is determined; a sub-identifier corresponding to the first orientation information in a first graphical identifier is determined, the first graphical identifier being set around the virtual character; and the prompt trigger event is displayed graphically on the graphical user interface through the sub-identifier.

Optionally, the first graphical identifier is a game model arranged in the game scene, or a control identifier arranged in the graphical user interface.

Optionally, at least one target virtual object that satisfies a prompt event is a sound source within a preset range determined according to the virtual character.

Optionally, at least one target virtual object that satisfies a prompt event is a virtual object that performs a preset operation on the virtual character.

Optionally, the first graphical identifier includes at least two sub-identifiers, the sub-identifiers being used to prompt orientation information of the target virtual object; and each of the sub-identifiers includes at least two display positions, the display positions being set around the virtual character at a preset height interval.

Optionally, the sub-identifier includes multiple identification units. The method further includes that: a target number of the target virtual object corresponding to the sub-identifiers is determined, and a corresponding number of the identification units is controlled to be displayed according to the target number.

Optionally, the first graphical identifier includes at least two sub-identifiers, and a display size of the sub-identifier is determined according to a position relationship between the sub-identifiers and the virtual character.

Optionally, a correspondence relationship between the sub-identifier and relative orientation information of the virtual character is pre-established; the first orientation information is a relative position relationship between the target virtual object and the virtual character; and the operation that a sub-identifier corresponding to the first orientation information in a first graphical identifier is determined is that: the sub-identifier corresponding to the first orientation information is determined according to the first orientation information and the correspondence relationship.

Optionally, the first orientation information includes at least one of the following information: height information and direction information on a horizontal plane.

Optionally, the first graphical identifier includes a basic graphical identifier and a height graphical identifier, the basic graphical identifier being displayed on the graphical user interface with a first display parameter, and the height graphical identifier being displayed with a second display parameter.

Optionally, the operation that the prompt trigger event is displayed graphically on the graphical user interface through the sub-identifier is that: the sub-identifier is controlled to be displayed with a third display parameter different from the first display parameter and the second display parameter.

Optionally, the types of the target virtual object include: enemy characters and teammate characters; the third display parameter includes a color parameter; and the operation that the sub-identifier is controlled to be displayed with a third display parameter different from the first display parameter and the second display parameter includes that: the sub-identifier is controlled to be displayed with the corresponding color parameter according to the types of the target virtual object.

Optionally, the first graphical identifier includes at least two sub-identifiers, the sub-identifiers being used to prompt orientation information of the target virtual object; and each of the sub-identifiers includes at least two display positions, the display positions being set around the virtual character at a preset horizontal interval.

Optionally, a correspondence relationship between the sub-identifier and relative orientation information of the virtual character is pre-established; the first orientation information is a relative position relationship of the target virtual object and the virtual character; and the operation that a sub-identifier corresponding to the first orientation information in a first graphical identifier is determined is that: the sub-identifier corresponding to the first orientation information is determined according to the first orientation information and the correspondence relationship, the first orientation information including direction information on a horizontal plane.

Optionally, the first graphical identifier is pre-controlled to be displayed with a first display parameter; and the operation that the prompt trigger event is displayed graphically on the graphical user interface through the sub-identifier is that: the sub-identifier is controlled to be displayed with a second display parameter different from the first display parameter.

Optionally, the types of the target virtual object include: enemy characters and teammate characters; the second display parameter includes a color parameter; and the operation that the sub-identifier is controlled to be displayed with a second display parameter different from the first display parameter includes that: the sub-identifier is controlled to be displayed with the corresponding color parameter according to the types of the target virtual object.

Optionally, the method further includes that: in response to a control instruction, the graphical user interface is controlled to switch from a first game screen to a second game screen, the second game screen being a game screen determined according to second orientation information corresponding to the sub-identifier in the game scene.

By means of the computer-readable storage medium provided in the application, a first graphical identifier is set around a virtual character. The first graphical identifier includes multiple sub-identifiers, each of which corresponds to different directions. When a target virtual object that satisfies a prompt trigger event is detected, first orientation information of the target virtual object is acquired, and a sub-identifier corresponding to the first orientation information in the first graphical identifier is determined, and the sub-identifier is further displayed on the graphical user interface to display a corresponding prompt trigger event. In this way, a sub-identifier set around a virtual character may clearly and comprehensively correspond to a spatial position of a target virtual object in a game scene, so that a user can intuitively understand the position of the target virtual object in a game.

In an optional implementation manner, the computer program is executed by the processor to implement the following steps:
  at least one target virtual object that satisfies a prompt trigger event is determined;
  a sub-identifier corresponding to the target virtual object in the first graphical identifier is determined, wherein the prompt trigger event is displayed graphically on the graphical user interface through the sub-identifier; and
  according to direction information corresponding to the sub-identifier in response to a visual field adjustment touch instruction, a current first presentation visual field of a game screen is controlled to be changed into a second presentation visual field of the game screen determined according to the direction information.

Optionally, at least one target virtual object that satisfies a prompt trigger event is at least one of the following: a sound source within a preset range determined according to the virtual character and a virtual object for performing a preset operation on the virtual character.

Optionally, the first graphical identifier includes at least two sub-identifiers, wherein the first graphical identifier is set around the virtual character.

Optionally, the operation that a sub-identifier corresponding to the target virtual object in the first graphical identifier is determined includes that:
  first orientation information of the target virtual object is acquired; and
  a corresponding sub-identifier on the graphical user interface is determined according to the first orientation information.

Optionally, a correspondence relationship between the sub-identifier and relative orientation information of the virtual character is pre-established; the first orientation information is a relative position relationship between the target virtual object and the virtual character; and the operation that a corresponding sub-identifier on the graphical user interface is determined according to the first orientation information is that: the corresponding sub-identifier on the graphical user interface is determined according to the first orientation information and the correspondence relationship.

Optionally, the first orientation information includes at least one of the following information: height information and direction information on a horizontal plane.

Optionally, the step of responding to a visual field adjustment touch instruction is to receive a touch operation acting on a preset touch region and trigger a corresponding control instruction.

Optionally, the preset touch region includes at least one of the following regions:
  a region corresponding to the sub-identifier corresponding to the target virtual object; and
  a blank region on the graphical user interface.

Optionally, the touch operation is at least one of the following: a touch operation acting on the preset touch region and meeting a preset duration;
a touch operation acting on the preset touch region and meeting a preset pressure value; and
a click operation acting on the preset touch region within a preset duration and meeting a preset number.

Optionally, after a current first presentation visual field of the game screen is controlled to be changed into a second presentation visual field of the game screen determined according to the direction information, the method further includes that:
in response to a release operation, the second presentation visual field of the game screen is restored to a state before responding to the visual field adjustment touch instruction, the release operation being an operation corresponding to the touch operation; or,
in response to an orientation adjustment trigger event, the current orientation of the virtual character is adjusted to an orientation corresponding to the second presentation visual field of the game screen.

Optionally, after a current first presentation visual field of the game screen is controlled to be changed into a second presentation visual field of the game screen determined according to the direction information, the method further includes that:
in response to a release operation, the current orientation of the virtual character is adjusted to an orientation corresponding to the second presentation visual field of the game screen, the release operation being an operation corresponding to the touch operation.

Optionally, the method further includes that: determination time of the target virtual object is recorded; and
The direction information corresponding to the sub-identifier is direction information of the sub-identifier corresponding to the target virtual object corresponding to determination time that satisfies a preset time sequence.

By means of the electronic device provided by the application, after determining a target virtual object that satisfies a prompt trigger event, a sub-identifier corresponding to the target virtual object is controlled to be displayed on a graphical user interface, game content presented in a game screen is further determined according to direction information corresponding to the sub-identifier after detecting a visual field adjustment touch instruction, the game screen is used as a second presentation visual field, and a current first presentation visual field of the game screen is controlled to be adjusted to the second presentation visual field. In this way, a player can quickly find the target virtual object in the graphical user interface, and a brand-new interaction mode and game experience are provided for the player.

Program codes included in the computer-readable storage medium may be transmitted by any suitable medium, including but not limited to wireless, wire, optical cable, radio frequency, etc., or any suitable combination of the foregoing.

Through the description of the above implementation manner, those skilled in the art will readily understand that the example implementation manners described herein may be implemented by software or by software in combination with necessary hardware. Therefore, the technical solution according to the embodiment of the application may be embodied in the form of a software product, which may be stored in a non-volatile storage medium (which may be a CD-ROM, a USB flash drive, a mobile hard disk, etc.) or on a network. A number of instructions are included to cause a computing device (which may be a personal computer, server, electronic device, or network device, etc.) to perform a method in accordance with an embodiment of the application.

Other embodiments of the disclosure will be apparent to those skilled in the art after considering the specification and practicing the disclosure herein. The present application is intended to cover any variations, uses, or adaptations of the disclosure, which are in accordance with the general principles of the disclosure and include common general knowledge or conventional technical means in the art that are not disclosed in the disclosure. The specification and examples are to be regarded as illustrative only, and the true scope and spirit of the disclosure are pointed out by the claims.

It is to be understood that the disclosure is not limited to the accurate structure that have been described and shown in the drawings, and may make various modifications and variations without departing the scope thereof. The scope of the disclosure is limited only by the appended claims.

What is claimed is:

1. An information processing method, applied to a touch terminal capable for rendering a graphical user interface (GUI), the GUI at least partially comprising a virtual character and a game scene, the method comprising:
determining first orientation information of at least one target virtual object that satisfies a prompt trigger event in the game scene, wherein the first orientation information is three-dimensional information related to the virtual object, and the prompt trigger event is a game event related to a virtual character determined according to game logic;
determining a sub-identifier corresponding to the first orientation information in a first graphical identifier, wherein the first graphical identifier is set around the virtual character; and
displaying the prompt trigger event graphically on the GUI through the sub-identifier corresponding to the first graphical identifier.

2. The method as claimed in claim 1, wherein the first graphical identifier is a game model arranged in the game scene, or a control identifier arranged in the GUI.

3. The method as claimed in claim 1, wherein the at least one target virtual object that satisfies the prompt event is at least one of the following:
at least one sound source within a preset range determined by the virtual character;
at least one virtual object that performs a preset operation on the virtual character.

4. The method as claimed in claim 1, wherein the first graphical identifier comprises at least two sub-identifiers, the at least two sub-identifiers being used for prompting orientation information of the target virtual object; and each of the at least two sub-identifiers comprises at least two display positions, the at least two display positions being set around the virtual character at a preset height interval.

5. The method as claimed in claim 1, wherein the sub-identifier comprises a plurality of identification units; and the method further comprises:
determining a target number of the target virtual object corresponding to the sub-identifiers, and controlling to display a corresponding number of the identification units according to the target number.

6. The method as claimed in claim 2, wherein the first graphical identifier comprises at least two sub-identifiers, and a display size of each of the at least two sub-identifiers is determined according to a position relationship between the each of the at least two sub-identifiers and the virtual character.

7. The method as claimed in claim 4, wherein a correspondence relationship between each of the at least two sub-identifier and relative orientation information of the virtual character is pre-established; the first orientation information is a relative position relationship between the target virtual object and the virtual character; and determining the sub-identifier corresponding to the first orientation information in the first graphical identifier comprises: determining the sub-identifier corresponding to the first orientation information according to the first orientation information and the correspondence relationship.

8. The method as claimed in claim 7, wherein the first orientation information comprises at least one of the following information: height information and direction information on a horizontal plane.

9. The method as claimed in claim 8, wherein the first graphical identifier comprises a basic graphical identifier and a height graphical identifier, the basic graphical identifier being displayed on the GUI with a first display parameter, and the height graphical identifier being displayed with a second display parameter.

10. The method as claimed in claim 9, wherein displaying the prompt trigger event graphically on the GUI through the sub-identifier comprises: controlling the sub-identifier to be displayed with a third display parameter different from the first display parameter and the second display parameter.

11. The method as claimed in claim 10, wherein the types of the target virtual object comprise: enemy characters and teammate characters; the third display parameter comprises a color parameter; and controlling the sub-identifier to be displayed with the third display parameter different from the first display parameter and the second display parameter comprises: controlling the sub-identifier to be displayed with the corresponding color parameter according to the types of the target virtual object.

12. The method as claimed in claim 1, wherein the first graphical identifier comprises at least two sub-identifiers, the at least two sub-identifiers being used for indicating orientation information of the target virtual object; and each of the at least two sub-identifiers comprises at least two display positions, the display positions being set around the virtual character at a preset horizontal interval.

13. The method as claimed in claim 12, wherein a correspondence relationship between the sub-identifier and relative orientation information of the virtual character is pre-established; the first orientation information is a relative position relationship between the target virtual object and the virtual character; and determining the sub-identifier corresponding to the first orientation information in the first graphical identifier comprises: determining the sub-identifier corresponding to the first orientation information according to the first orientation information and the correspondence relationship, the first orientation information comprising direction information on a horizontal plane.

14. The method as claimed in claim 1, wherein the first graphical identifier is pre-controlled to be displayed with a first display parameter; and displaying the prompt trigger event graphically on the GUI through the sub-identifier comprises: controlling the sub-identifier to be displayed with a second display parameter different from the first display parameter.

15. The method as claimed in claim 14, wherein the types of the target virtual object comprise: enemy characters and teammate characters; the second display parameter comprises a color parameter; and controlling the sub-identifier to be displayed with the second display parameter different from the first display parameter comprises: controlling the sub-identifier to be displayed with the corresponding color parameter according to the types of the target virtual object.

16. The method as claimed in claim 1, further comprising:

in response to a control instruction, controlling the GUI to switch from a first game screen to a second game screen, wherein the second game screen is a game screen determined according to second orientation information corresponding to the sub-identifier in the game scene.

17. An electronic device, comprising:

a processor; and a memory, configured to store an executable instruction of the processor, wherein the processor is configured to perform the information processing method by executing the executable instruction, wherein the method applied to a touch terminal capable for rendering a graphical user interface (GUI), the GUI at least partially comprising a virtual character and a game scene, the method comprising:

determining first orientation information of at least one target virtual object that satisfies a prompt trigger event in the game scene, wherein the first orientation information is three-dimensional information related to the virtual object, and the prompt trigger event is a game event related to a virtual character determined according to game logic;

determining a sub-identifier corresponding to the first orientation information in a first graphical identifier, wherein the first graphical identifier is set around the virtual character; and displaying the prompt trigger event graphically on the GUI through the sub-identifier corresponding to the first graphical identifier.

18. A non-transitory computer-readable storage medium, storing a program, wherein the program is executed by a processor to implement the information processing method, applied to a touch terminal capable for rendering a graphical user interface (GUI), the GUI at least partially comprising a virtual character and a game scene, the method comprising:

determining first orientation information of at least one target virtual object that satisfies a prompt trigger event in the game scene, wherein the first orientation information is three-dimensional information related to the virtual object, and the prompt trigger event is a game event related to a virtual character determined according to game logic;

determining a sub-identifier corresponding to the first orientation information in a first graphical identifier, wherein the first graphical identifier is set around the virtual character; and displaying the prompt trigger event graphically on the GUI through the sub-identifier corresponding to the first graphical identifier.

19. The method as claimed in claim 1, wherein the first graphical identifier comprises at least two sub-identifiers, and the first graphical identifier is at least one of a multi-level ring-shaped model identifier or a perspective plane geometric shape identifier that consists of at least two sub-identifiers set around the virtual character at a preset height interval.

20. The method as claimed in claim 19, wherein the at least two sub-identifiers of the multi-level ring-shaped model identifier or the perspective plane geometric shape identifier are set around the virtual character in a first display parameter, to correspond to different orientation and height respectively; and displaying the prompt trigger event graphically on the GUI through the sub-identifier corresponding to the first graphical identifier is controlling the sub-identifier to display with a second display parameter that is different with the first display parameter.

\* \* \* \* \*